(12) United States Patent
Gorokhov et al.

(10) Patent No.: US 8,867,380 B2
(45) Date of Patent: *Oct. 21, 2014

(54) SCHEDULING ALGORITHMS FOR COOPERATIVE BEAMFORMING

(75) Inventors: Alexei Y. Gorokhov, San Diego, CA (US); Jaber M. Borran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 269 days.

This patent is subject to a terminal disclaimer.

(21) Appl. No.: 12/698,028

(22) Filed: Feb. 1, 2010

(65) Prior Publication Data

US 2010/0202308 A1 Aug. 12, 2010

Related U.S. Application Data

(60) Provisional application No. 61/149,284, filed on Feb. 2, 2009, provisional application No. 61/149,434, filed on Feb. 3, 2009.

(51) Int. Cl.
*H04L 12/26* (2006.01)
*H04B 7/06* (2006.01)
*H04W 16/28* (2009.01)
*H04B 7/04* (2006.01)

(52) U.S. Cl.
CPC ............ *H04B 7/0417* (2013.01); *H04B 7/0634* (2013.01); *H04W 16/28* (2013.01); *H04B 7/0626* (2013.01)
USPC ............................ 370/252; 370/310; 370/338

(58) Field of Classification Search
CPC .. H04B 7/0417; H04B 7/0626; H04B 7/0634; H04W 16/28
USPC .................. 370/252, 310, 334, 338
See application file for complete search history.

(56) References Cited

U.S. PATENT DOCUMENTS

| 6,697,642 | B1 | 2/2004 | Thomas |
| 2004/0014429 | A1 | 1/2004 | Guo |
| 2006/0233131 | A1 | 10/2006 | Gore et al. |
| 2007/0064632 | A1 | 3/2007 | Zheng et al. |
| 2007/0082619 | A1* | 4/2007 | Zhang et al. ............. 455/69 |
| 2007/0211786 | A1* | 9/2007 | Shattil ............. 375/141 |
| 2007/0230373 | A1 | 10/2007 | Li et al. |
| 2007/0243878 | A1* | 10/2007 | Taira et al. ............. 455/450 |
| 2007/0297576 | A1* | 12/2007 | Hara ............. 379/1.01 |

(Continued)

FOREIGN PATENT DOCUMENTS

| JP | 2005354665 A | 12/2005 |
| JP | 2008187452 A | 8/2008 |

(Continued)

OTHER PUBLICATIONS

International Search Report and Written Opinion—PCT/US2010/022876, International Search Authority—European Patent Office—Sep. 6, 2010.*

(Continued)

*Primary Examiner* — Gary Mui
(74) *Attorney, Agent, or Firm* — Anthony R. Morris

(57) ABSTRACT

Certain aspects of the present disclosure support techniques for cooperative beamforming based on inter-cell coordination. Signaling design allows coordinated downlink transmissions with reduced inter-cell interference.

46 Claims, 14 Drawing Sheets

(a)

(b)

(c)

(d)

(56) References Cited

U.S. PATENT DOCUMENTS

| | | | |
|---|---|---|---|
| 2008/0084350 A1* | 4/2008 | Uno et al. | 342/367 |
| 2008/0161033 A1* | 7/2008 | Borran et al. | 455/522 |
| 2008/0212701 A1* | 9/2008 | Pan et al. | 375/260 |
| 2008/0317145 A1* | 12/2008 | Clerckx et al. | 375/260 |
| 2009/0004986 A1 | 1/2009 | Park et al. | |
| 2009/0041150 A1 | 2/2009 | Tsai et al. | |
| 2009/0046800 A1* | 2/2009 | Xu et al. | 375/267 |
| 2009/0179797 A1* | 7/2009 | Kwon et al. | 342/368 |
| 2010/0099428 A1* | 4/2010 | Bhushan et al. | 455/452.1 |
| 2010/0099449 A1* | 4/2010 | Borran et al. | 455/501 |
| 2010/0189055 A1 | 7/2010 | Ylitalo | |
| 2010/0195527 A1 | 8/2010 | Gorokhov et al. | |
| 2011/0150004 A1* | 6/2011 | Denteneer et al. | 370/476 |

FOREIGN PATENT DOCUMENTS

| | | |
|---|---|---|
| WO | WO 2008097041 | 8/2008 |
| WO | 2008115110 A1 | 9/2008 |
| WO | WO 2008115585 | 9/2008 |
| WO | 2009012350 A1 | 1/2009 |

OTHER PUBLICATIONS

"DL Coordinated Beam Switching for Interference Management in LTE-Advanced", Source: Huawei, 3GPP TSG RAN WG1#54bis, R1-083710, Prague, Czech Republic, Sep. 29-Oct. 3, 2008.

"CQI and CSI Feedback Compression", Source: Alcatel-Lucent, 3GPP TSG RAN WG1 #55, R1-084139, Prague, Czech Republic, Nov. 10-14, 2008.

"Scalable CoMP Solutions for LTE Advanced", Source: Nokia Siemens Networks, Nokia, 3GPP TSG-RAN WG1 Meeting #55, R1-084322, Prague, Czech Republic, Nov. 10-14, 2008.

"Coordinated Multi-Point Downlink Transmission in LTE-Advanced", Source: Qualcomm Europe, 3GPP TSG-RAN WG1 #55, R1-084400, Prague, Czech Republic, Nov. 10-15, 2008.

"Impact of Downlink CoMP on the Air Interface", Source: Qualcomm Europe, 3GPP TSG-RAN WG1 #55bis, R1-090366, Ljubljana, Slovenia, Jan. 12-16, 2009.

"Multiple Description Coding for Spatial Feedback Payload Reduction", Source: Qualcomm Europe, 3GPP TSG-RAN WG1 #55bis, R1-090367, Ljubljana, Slovenia, Jan. 12-16, 2009.

"Refinement of Hot Spot and Femto Deployment Parameters", Source: Qualcomm Europe, Mitsubishi Electric, 3GPP TSG-RAN WG1 #55bis, R1-090490, Ljubljana, Slovenia, Jan. 12-Jan. 16, 2008.

3GPP TR 36.814 V0.4.1 (Feb. 2009), 3rd Generation Partnership Project; Technical Specification Group Radio Access Network; Further Advancements for E-UTRA Physical Layer Aspects (Release 9), Feb. 2009.

3GPP TS 36.213 V8.5.0 (Dec. 2008) 3rd Generation Partnership Project; Technical Specification Group Radio Access Network; Evolved Universal Terrestrial Radio Access (E-UTRA); Physical layer procedures (Release 8) 3rd Generation Partnership Project (3GPP); Technicalspecification (TS), XX, XX, [Online] vol. 36.213, No. TS 36.213 V8.5.0, Dec. 1, 2008, pp. 1-16, XP002572343 Retrieved from the Internet: URL:http://www.3gpp.org/ftp/Specs/archive/36_series/36.213/> [retrieved on Feb. 25, 2010] p. 33-p. 47.

International Search Report and Written Opinion—PCT/US2010/022876, International Search Authority—European Patent Office—Sep. 6, 2010.

Taiwan Search Report—TW099103109—TIPO—Jan. 16, 2013.

* cited by examiner

SCHEDULING ALGORITHMS FOR COOPERATIVE BEAMFORMING

CLAIM OF PRIORITY UNDER 35 U.S.C. §119

The present application for patent claims benefit of Provisional Application Ser. No. 61/149,284 filed Feb. 2, 2009 and Provisional Application Ser. No. 61/149,434 filed Feb. 3, 2009, and assigned to the assignee hereof and hereby expressly incorporated by reference herein.

CROSS REFERENCE TO RELATED APPLICATIONS

The present Application is related by subject matter to U.S. patent application Ser. No. 12/698,036, entitled "SCHEDULING ALGORITHMS FOR COOPERATIVE BEAMFORMING BASED ON RESOURCE QUALITY INDICATION" filed herewith and assigned to the assignee hereof and hereby expressly incorporated by reference herein.

BACKGROUND

1. Field

Certain aspects of the present disclosure generally relate to wireless communications and, more particularly, to scheduling methods for cooperative beamforming.

2. Background

Coordinated multi-point (CoMP) is being considered as a key enabler of high spectral efficiency requirements set forth by the Long Term Evolution Advanced (LTE-A) standard. A common utility-based framework has been proposed in the LTE-A standard to handle downlink cooperative transmission across cells, resource partitioning in heterogeneous deployments, as well as user equipment (UE) association in a unified fashion. There are two key elements in the proposed framework: a notion of projected utility and a real time coordination of scheduling decisions across cooperative cells.

The notion of projected utility accounts for spectral efficiency, backhaul capacity and latency, channel state information accuracy, UE scheduling priority in terms of Quality of Service (QoS)/fairness as well as UE and network capabilities. Calculation of the projected utility based on inter-cell information exchange over the backhaul may not always lead to accurate coordination of scheduling and transmission decisions. This applies, in particular, to Wireless Wide Area Network (WWAN) deployments with a generic Internet Protocol (IP) backhaul and/or home eNodeB (HeNB) deployments with the standard consumer backhaul. In such scenarios, over-the-air signaling may be required to achieve efficient real-time scheduling coordination.

SUMMARY

Certain aspects of the present disclosure provide a method for wireless communications. The method generally includes receiving, at a cell, one or more Spatial Feedback Information (SFI) messages from one or more neighboring user terminals, each SFI message was transmitted in response to a Request to deliver Spatial Feedback Information (SFI-REQ) to one or more interfering cells of the neighboring user terminals, the SFI message comprises information about a channel between one of the neighboring user terminals and the cell, and adjusting at least one of a beam direction or a power for data transmission based on the SFI messages.

Certain aspects provide an apparatus for wireless communications. The apparatus generally includes a receiver configured to receive one or more Spatial Feedback Information (SFI) messages from one or more neighboring user terminals, each SFI message was transmitted in response to a Request to deliver Spatial Feedback Information (SFI-REQ) to one or more interfering cells of the neighboring user terminals, the SFI message comprises information about a channel between one of the neighboring user terminals and the apparatus, and a circuit configured to adjust at least one of a beam direction or a power for data transmission based on the SFI messages.

Certain aspects provide an apparatus for wireless communications. The apparatus generally includes means for receiving one or more Spatial Feedback Information (SFI) messages from one or more neighboring user terminals, each SFI message was transmitted in response to a Request to deliver Spatial Feedback Information (SFI-REQ) to one or more interfering cells of the neighboring user terminals, the SFI message comprises information about a channel between one of the neighboring user terminals and the apparatus, and means for adjusting at least one of a beam direction or a power for data transmission based on the SFI messages.

Certain aspects provide a computer-program product for wireless communications comprising a computer readable medium having instructions stored thereon, the instructions being executable by one or more processors. The instructions generally include instructions for receiving, at a cell, one or more Spatial Feedback Information (SFI) messages from one or more neighboring user terminals, each SFI message was transmitted in response to a Request to deliver Spatial Feedback Information (SFI-REQ) to one or more interfering cells of the neighboring user terminals, the SFI message comprises information about a channel between one of the neighboring user terminals and the cell, and instructions for adjusting at least one of a beam direction or a power for data transmission based on the SFI messages.

Certain aspects provide an apparatus for wireless communications. The apparatus generally includes at least one processor configured to receive one or more Spatial Feedback Information (SFI) messages from one or more neighboring user terminals, each SFI message was transmitted in response to a Request to deliver Spatial Feedback Information (SFI-REQ) to one or more interfering cells of the neighboring user terminals, the SFI message comprises information about a channel between one of the neighboring user terminals and the apparatus, and adjust at least one of a beam direction or a power for data transmission based on the SFI messages, and a memory coupled to the at least one processor.

Certain aspects of the present disclosure provide a method for wireless communications. The method generally includes, in response to a Request to deliver Spatial Feedback Information (SFI-REQ) to one or more interfering cells, transmitting, from a user terminal to the interfering cells, one or more Spatial Feedback Information (SFI) messages, each SFI message comprises information about a channel between the user terminal and one of the interfering cells, the SFI-REQ was transmitted from a serving cell of the user terminal, and receiving, from the serving cell, a reference signal comprising an indication about an adjusted beam direction of the serving cell, the adjustment is based on one or more SFI messages received at the serving cell from one or more user terminals served by the interfering cells.

Certain aspects provide an apparatus for wireless communications. The apparatus generally includes a transmitter configured to transmit, to one or more interfering cells in response to a Request to deliver Spatial Feedback Information (SFI-REQ) to the interfering cells, one or more Spatial Feedback Information (SFI) messages, each SFI message comprises information about a channel between the apparatus and one of the interfering cells, the SFI-REQ was transmitted from a serving cell of the apparatus, and a receiver configured to receive, from the serving cell, a reference signal comprising an indication about an adjusted beam direction of the serving cell, the adjustment is based on one or more SFI messages received at the serving cell from one or more user terminals served by the interfering cells.

Certain aspects provide an apparatus for wireless communications. The apparatus generally includes means for transmitting, to one or more interfering cells in response to a Request to deliver Spatial Feedback Information (SFI-REQ) to the interfering cells, one or more Spatial Feedback Information (SFI) messages, each SFI message comprises information about a channel between the apparatus and one of the interfering cells, the SFI-REQ was transmitted from a serving cell of the apparatus, and means for receiving, from the serving cell, a reference signal comprising an indication about an adjusted beam direction of the serving cell, the adjustment is based on one or more SFI messages received at the serving cell from one or more user terminals served by the interfering cells.

Certain aspects provide a computer-program product for wireless communications comprising a computer readable medium having instructions stored thereon, the instructions being executable by one or more processors. The instructions generally include instructions for transmitting, from a user terminal to one or more interfering cells in response to a Request to deliver Spatial Feedback Information (SFI-REQ) to the interfering cells, one or more Spatial Feedback Information (SFI) messages, each SFI message comprises information about a channel between the user terminal and one of the interfering cells, the SFI-REQ was transmitted from a serving cell of the user terminal, and instructions for receiving, from the serving cell, a reference signal comprising an indication about an adjusted beam direction of the serving cell, the adjustment is based on one or more SFI messages received at the serving cell from one or more user terminals served by the interfering cells.

Certain aspects provide an apparatus for wireless communications. The apparatus generally includes at least one processor configured to, in response to a Request to deliver Spatial Feedback Information (SFI-REQ) to one or more interfering cells, transmit, to the interfering cells, one or more Spatial Feedback Information (SFI) messages, each SFI message comprises information about a channel between the apparatus and one of the interfering cells, the SFI-REQ was transmitted from a serving cell of the apparatus, and receive, from the serving cell, a reference signal comprising an indication about an adjusted beam direction of the serving cell, the adjustment is based on one or more SFI messages received at the serving cell from one or more user terminals served by the interfering cells, and a memory coupled to the at least one processor.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
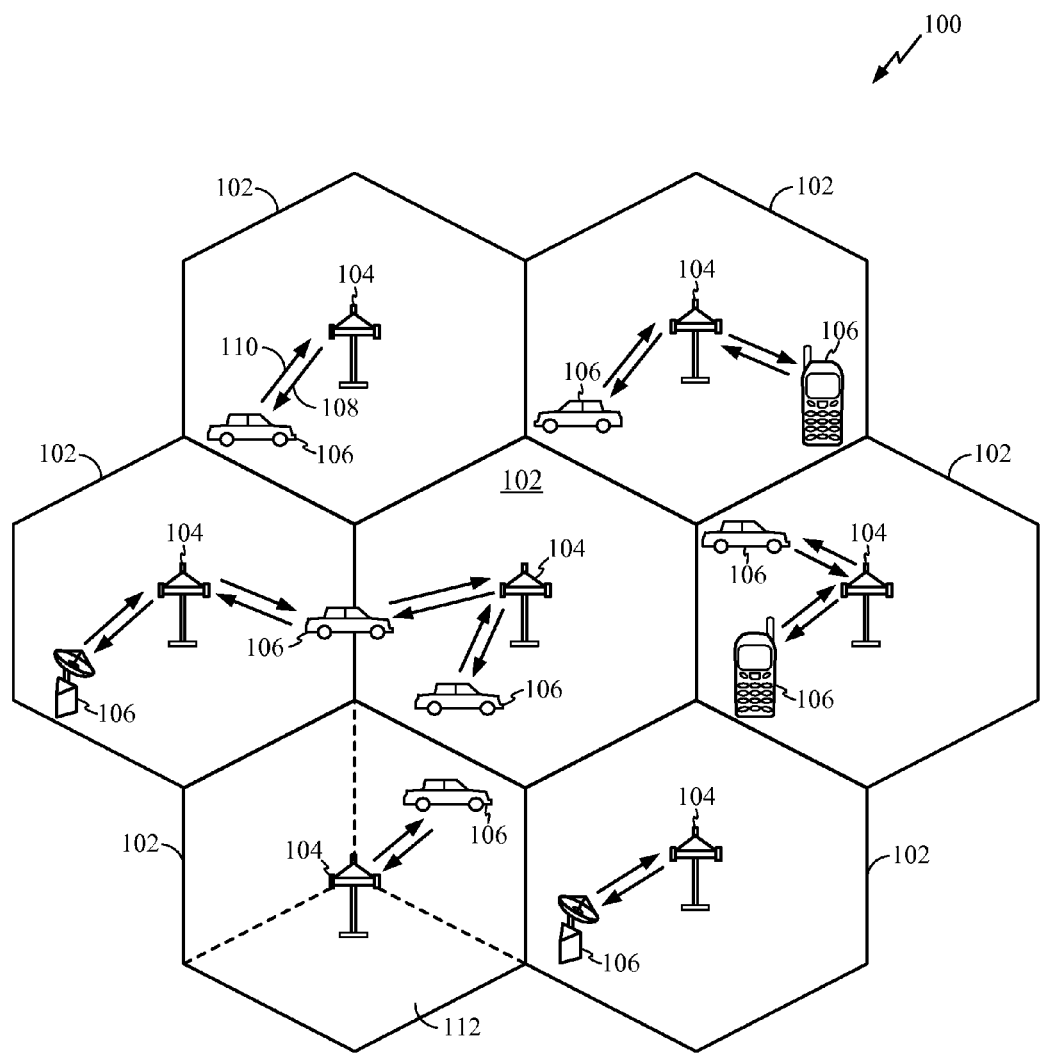
FIG. 1 illustrates an example wireless communication system in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different wireless technologies, system configurations, networks and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP LTE, or Evolved UTRA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates an example of a wireless communication system 100 in which aspects of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system. Alternatively, signals may be sent and received between the base stations 104 and the user terminals 106 in accordance with SC-FDMA technique. If this is the case, the wireless communication system 100 may be referred to as a SC-FDMA system.

A communication link that facilitates transmission from a base station 104 to a user terminal 106 may be referred to as a downlink (DL) 108, and a communication link that facilitates transmission from a user terminal 106 to a base station 104 may be referred to as an uplink (UL) 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
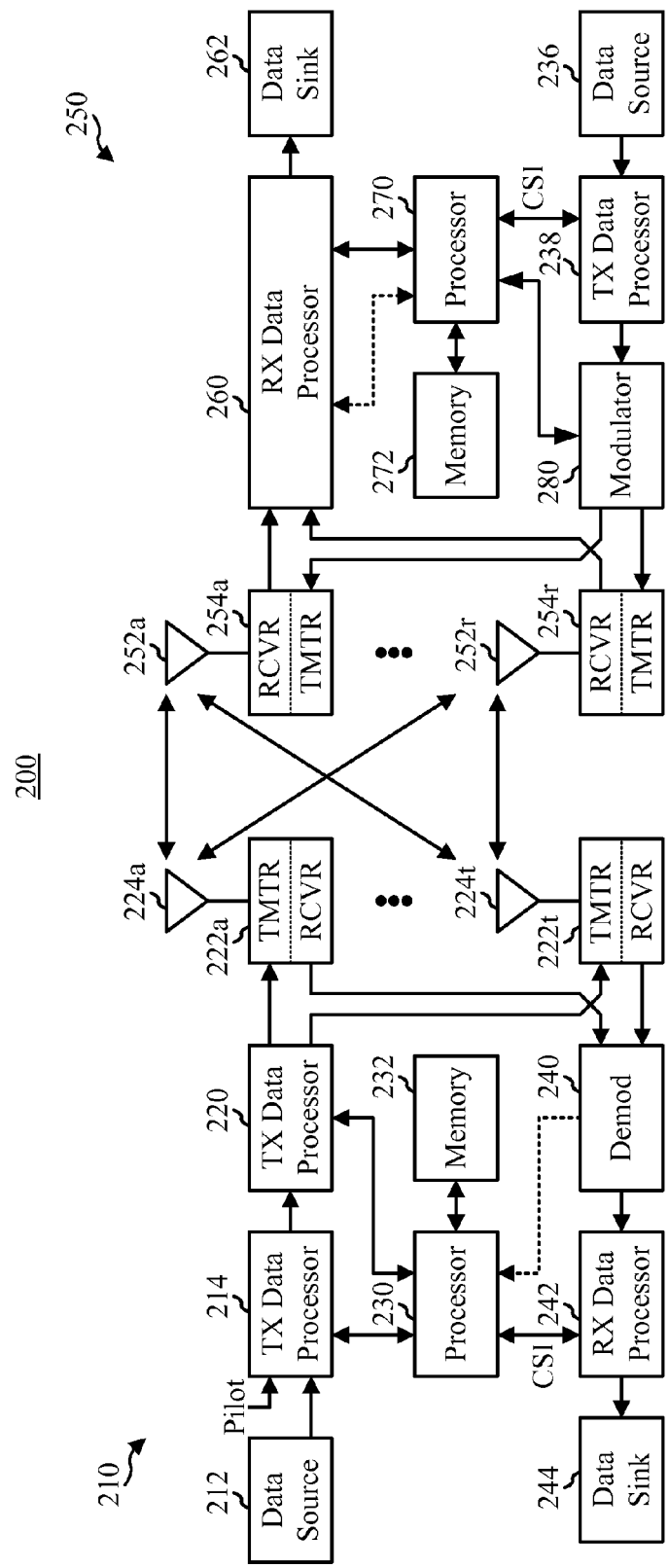
FIG. 2 illustrates a schematic diagram of wireless devices in accordance with certain aspects of the present disclosure.

FIG. 2 illustrates an example wireless network environment 200 in accordance with certain aspects set forth herein. Wireless network environment 200 depicts one base station 210 and one mobile device 250 for sake of brevity. However, it is contemplated that system 200 can include one or more base stations and/or one or more mobile devices, wherein additional base stations and/or mobile devices can be substantially similar or different from illustrated base station 210 and illustrated mobile device 250 described herein. In addition, it is contemplated that base station 210 and/or mobile device 250 can employ the systems, techniques, configurations, aspects, aspects, and/or methods described herein to facilitate wireless communication between them.

At base station 210, traffic data for a number of data streams is provided from a data source 212 to transmit (TX) data processor 214. In certain aspects, each data stream can be transmitted over a respective antenna and/or over multiple antennas. TX data processor 214 formats, codes, and interleaves the traffic data stream based on a particular coding scheme selected for that data stream to provide coded data.

The coded data for each data stream can, for example, be multiplexed with pilot data using orthogonal frequency division multiplexing (OFDM) techniques. Additionally or alternatively, the pilot symbols can be code division multiplexed (CDM) with coded data, frequency division multiplexed (FDM), or time division multiplexed (TDM). The pilot data is typically a known data pattern that is processed in a known manner and can be used at mobile device 250 to estimate channel response or other communication parameters and/or characteristics. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding and modulation for each data stream can be determined by instructions performed or provided by processor 230.

The modulation symbols for the data streams can be provided to a TX MIMO processor 220, which can further process the modulation symbols. TX multiple-input multiple-output (MIMO) processor 220 then provides $N_T$ modulation symbol streams to $N_T$ transmitters (TMTR) 222a through 222t. In certain aspects, TX MIMO processor 220 applies certain multi-antenna techniques, such spatial multiplexing, diversity coding or precoding (i.e., beamforming, with weights being applied to the modulation symbols of the data streams and to the antenna from which the symbol is being transmitted).

Each transmitter 222 receives and processes a respective modulation symbol stream to provide one or more analog signals, and further conditions (e.g., amplifies, filters, upconverts, etc.) the analog signals to provide a modulated signal suitable for transmission over the MIMO channel. Further, $N_T$ modulated signals from transmitters 222a through 222t are transmitted from $N_T$ antennas 224a through 224t, respectively.

At mobile device 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, downconverts, etc.) a respective signal, digitizes the conditioned signal to provide samples, and further processes the samples to provide a corresponding "received" symbol stream.

A receive (RX) data processor 260 can receive and process the $N_R$ received symbol streams from $N_R$ receivers 254 based on a particular receiver processing technique to provide $N_T$ "detected" symbol streams. RX data processor 260 can demodulate, de-interleave, and decode (and perform other processing for) each detected symbol stream to recover the traffic data for the data stream, and provide the traffic data to a data sink 262. In certain aspects, for mobile device 250, the processing by RX data processor 260 can be complementary to that performed by TX MIMO processor 220 and TX data processor 214 at base station 210.

A processor 270 can periodically determine which precoding matrix to utilize as discussed above. Further, processor 270 can formulate a reverse link message comprising a matrix index portion and a rank value portion. The reverse link message can comprise various types of information regarding the communication link and/or the received data stream. The reverse link message can be processed by a TX data processor 238, which also receives traffic data for a number of data streams from a data source 236, modulated by a modulator 280, conditioned by transmitters 254a through 254r, and transmitted back to base station 210.

At base station 210, the modulated signals from mobile device 250 are received by $N_R$ antennas 224, conditioned by respective $N_R$ receivers 222, demodulated by a demodulator 240, and processed by a RX data processor 242 to extract the reverse link message transmitted by mobile device 250, and provide the reverse link message to a data sink 244. Further, processor 230 can process the extracted message to determine which precoding matrix to use for determining the beamforming weights.

Processors 230 and 270 can direct (e.g., control, coordinate, manage, etc.) operation at base station 210 and mobile device 250, respectively. Respective processors 230 and 270 can be associated with memory 232 and 272 that store program codes and data. Processors 230 and 270 can also perform computations to derive frequency and impulse response estimates for the uplink and downlink, respectively. All "processor" functions can be migrated between and among process modules such that certain processor modules may not be present in certain aspects, or additional processor modules not illustrated herein may be present.

Memory 232 and 272 (as with all data stores disclosed herein) can be either volatile memory or nonvolatile memory or can include both volatile and nonvolatile portions, and can be fixed, removable or include both fixed and removable portions. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink™ DRAM (SLDRAM), and direct Rambus™ RAM (DRRAM). Memory 232 and 272 of the certain aspects is intended to comprise, without being limited to, these and any other suitable types of memory.

Figure 3:
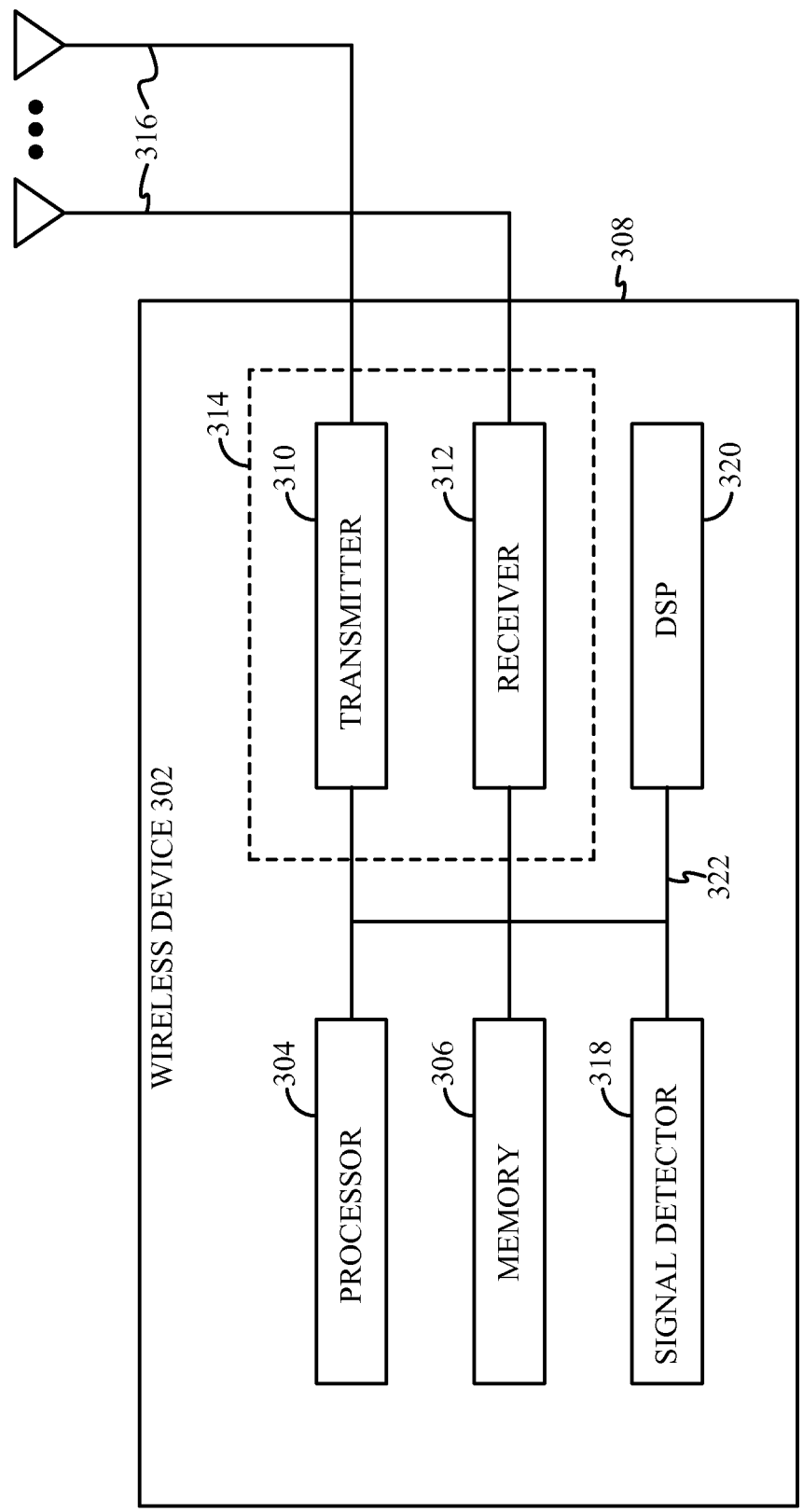
FIG. 3 illustrates various components that may be utilized in a wireless device in accordance with certain aspects of the present disclosure.

FIG. 3 illustrates various components that may be utilized in a wireless device 302 that may be employed within the wireless communication system illustrated in FIG. 1. The wireless device 302 is an example of a device that may be configured to implement the various methods described herein. The wireless device 302 may be a base station 100 or any of user terminals 116 and 122.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Certain aspects of the present disclosure support inter-cell cooperation signaling (i.e., signaling between adjacent cells of a wireless communication system) for coordinated downlink transmissions. By applying the proposed approach, substantial gain in mitigating inter-cell interference may be achieved.

Cooperative Transmission

Scenarios and Requirements

Various forms of inter-cell cooperation and deployment scenarios in wireless networks, such as the wireless network 100 illustrated in FIG. 1 are first discussed to motivate requirements for downlink coordination signaling. Downlink coordinated beam-switching can be considered, which represents a simple form of cooperative beamforming (CB). Certain aspects of the present disclosure support performing downlink beam sweeping with a pre-defined pattern in every cell. Beam patterns of different cells may be synchronized across time/frequency resources (i.e., subframes and/or resource blocks (RBs)), and user equipments (UEs) may periodically feed back channel quality observed on different resources corresponding to different combinations of serving and interfering beams.

Each cell may schedule UEs according to channel and interference conditions thereby simultaneously achieving opportunistic beamforming and (spatial) interference avoidance. Such inter-cell cooperation based on a predefined set of beams may trade gains of closed loop precoding of the baseline uncoordinated transmission in exchange for spatial interference avoidance gains. Such tradeoff may not be beneficial in the scenarios when only a few UEs are present in a cell and/or for bursty traffic patterns. To leverage spatial coordination gain without losing the gain of closed loop precoding in the scenarios of practical interest, coordinated scheduling may be enabled along with short-term selection of serving beams within every cell based on the set of active UEs, their priorities in terms of QoS and fairness, as well as on short-term channel conditions.

It should be noted that coordinated beam-switching may rely upon availability of a timely channel quality feedback from a possibly large number of UEs. The total feedback overhead may be even higher in the presence of resource specific reporting and/or MIMO transmission. Beam variations due to spatial coordination, as well as transmit power variations due to interference coordination in heterogeneous networks may lead to large variations in channel quality information (CQI) across different resources. Resource specific reporting may be particularly important in these scenarios. The amount of uplink feedback may be reduced substantially in the scenarios where a limited number of UEs are considered for scheduling in the upcoming subframes based on their scheduling priority and/or buffer availability.

To reduce uplink overhead associated with channel quality reporting, a poll-based reporting may be enabled where a serving cell requests (resource specific) channel quality reports from a subset of UEs that are considered for scheduling in the upcoming subframe(s). These channel quality reports may be based on the actual beams to be used by the serving and interfering cells on the reported resources.

In the abovementioned scenarios, cooperation between the cells may be limited to opportunistic scheduling of UEs based on favorable channel and interference conditions. While such a simple form of cooperation may be sufficient in some scenarios seen in WWAN deployments with a relatively large number of active UEs and with a diversity of spatial channel conditions, it may not suffice in many cases of interest.

Such situations may arise, for example, in WWAN scenarios with only a few active UEs in a cell located within a handoff region with adjacent cells. Such UEs may experience poor channel quality most of the time unless there is some cooperation between adjacent cells. The cooperation may take the form of the serving cell choosing an orthogonal beam or simply of reducing its transmit power on some resources to improve the signal-to-interference-plus-noise ratio (SINR) of the interfered UE. It should be noted that the cost of cooperation by the adjacent cells may be relatively low especially when these cells are serving UEs with moderate to high carrier-to-interference (C/I) ratio.

Figure 4:
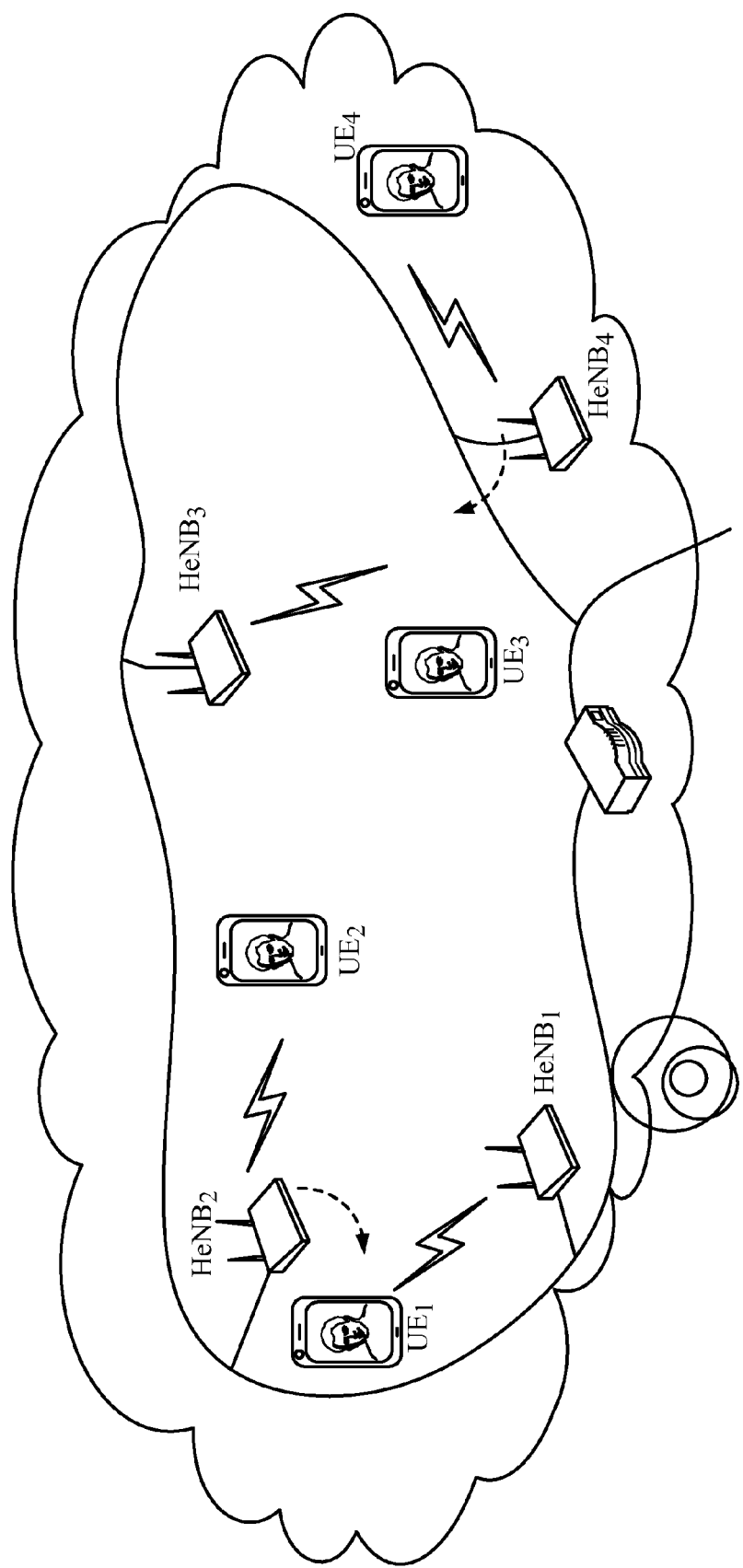
FIG. 4 illustrates example interference scenarios in a close subscriber group in accordance with certain aspects of the present disclosure.

Another example can be HeNB deployment with Closed Subscriber Group (CSG) illustrated in FIG. 4. In a typical HeNB deployment, most cells may be associated with only a few (typically just one) active UEs. In this example, as illustrated in FIG. 4, the $UE_1$ may be associated with the $HeNB_1$, however, it may happen that the $UE_1$ has a (much) stronger channel to the $HeNB_2$, which may belong to a different CSG and may serve the $UE_2$. In this case, the throughput-fairness tradeoff may be significantly improved through cooperation between the $HeNB_1$ and the $HeNB_2$. As in the previous example, the cooperation may take the form of the $HeNB_2$ choosing a beam that steers away from the $UE_1$, or by the $HeNB_2$ reducing its transmit power so as to reduce the amount of interference it causes to the $UE_1$. It should be noted that opportunistic cooperation may not be efficient in this scenario as the $UE_1$ may observe low serving C/I conditions most of the time.

Moreover, in many scenarios of practical interest it may be important to enable inter-cell cooperation in a low-latency fashion. One exemplary case is when UEs being served observe bursty traffic arrivals. Interference coordination on a slow time-scale may lead to very inefficient resource usage and may adversely affect packet latencies experienced by the UEs. Moreover, interference coordination on a slow time-scale may lead to outdated spatial information in medium and high mobility scenarios, in many cases rendering spatial coordination ineffective.

In order to improve throughput/fairness tradeoff and enable efficient cooperation in harsh interference scenarios (e.g., in the CSG illustrated in FIG. 4), a low-latency mechanism to request cooperation (i.e., appropriate power or beam selection) by neighbor cells may be beneficial.

Signaling Structure and Timeline

Figure 5:
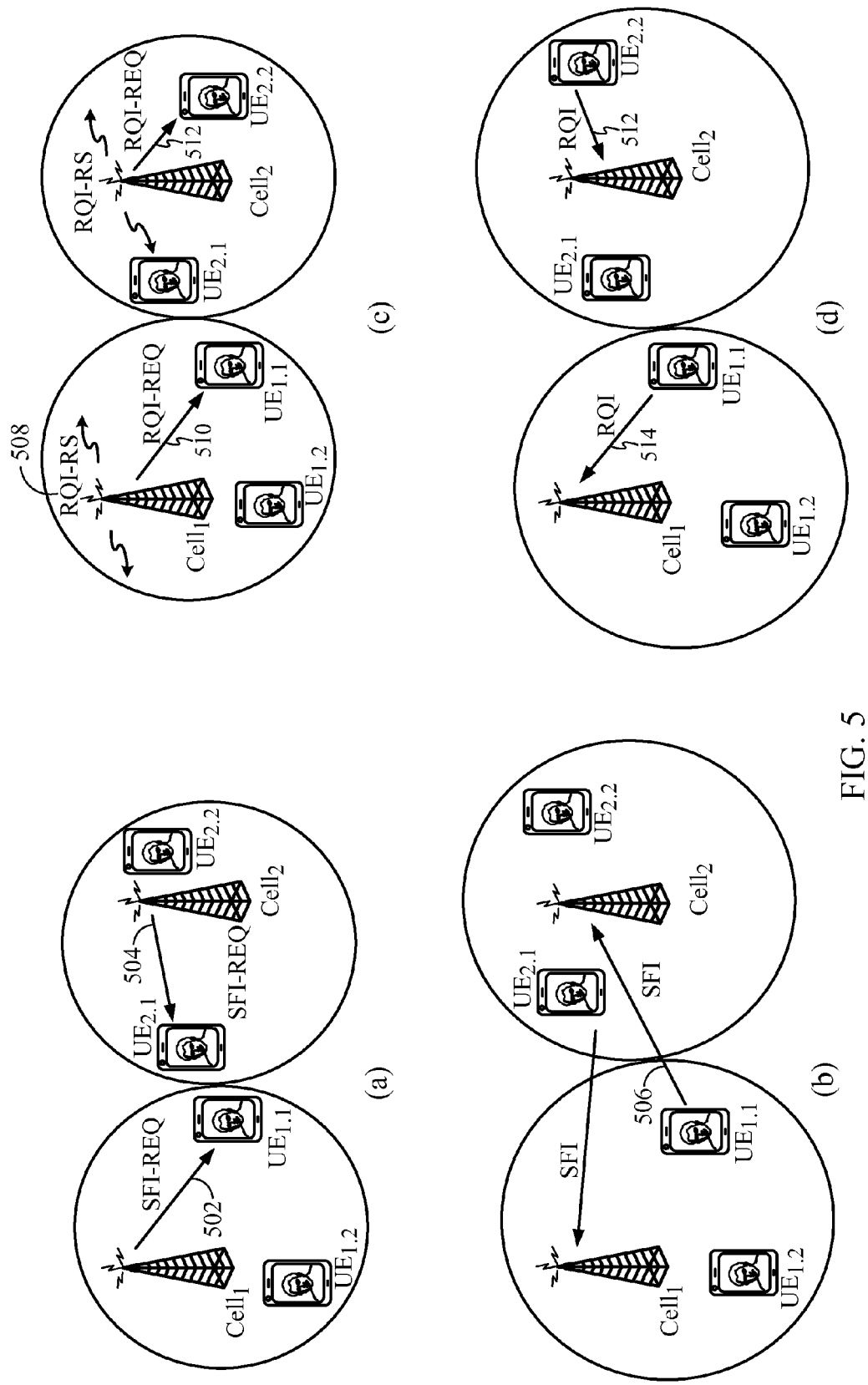
FIG. 5 illustrates an example interference coordination sequence in accordance with certain aspects of the present disclosure.
Figure 6:
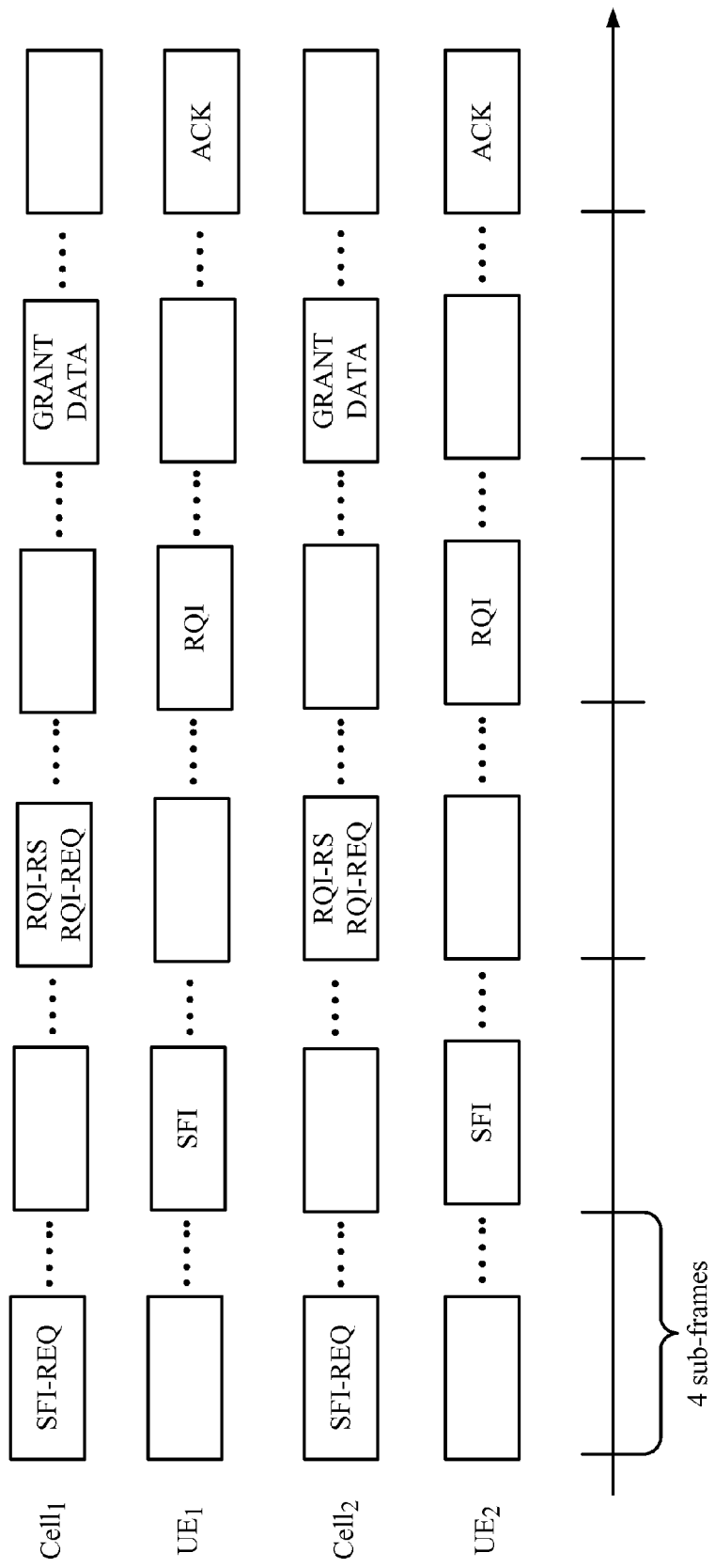
FIG. 6 illustrates an example interference coordination timeline in accordance with certain aspects of the present disclosure.

The previously described interference coordination may be carried out over a backhaul X2 interface if a sufficiently fast backhaul is available. However, in many scenarios such as the previously described HeNB scenario, the backhaul may be slow or unreliable, or may lack the X2 interface. To account for such scenarios, over-the-air (OTA) signaling design is proposed in the present disclosure that meets previously outlined requirements. The design is illustrated by an example in FIG. 5 and the corresponding timeline is illustrated in FIG. 6.

For every subframe and a set of time-frequency resources (e.g. a set of RBs of a given subframe), each cell may decide on a subset of UEs tentatively assigned to these resources. In general, this decision may be carried out based on a long-term projected utility of a scheduling decision. Consistent with this decision, each cell may send a request to all or some of the tentatively assigned UEs in order to deliver Spatial Feedback Information (SFI) message(s) to one or more of their dominant interferers, as illustrated in FIG. 5A.

Such a request for the SFI transmitted from the serving cell (e.g., the $Cell_1$ illustrated in FIG. 5) called SFI-REQ may indicate the target dominant interferers and possibly frequency resources on which a UE (e.g., the $UE_{1,1}$ from FIG. 5) may be pre-scheduled. Each UE that receives an SFI-REQ may subsequently send SFI to all the target cells indicated in the SFI-REQ, as illustrated in FIG. 5B. An SFI report may contain a quantized spatial direction of the channel between the UE and the cell to which the SFI is sent, called channel direction information (CDI). This feedback may be utilized by the target cell to cooperatively choose transmit beam (or gate its downlink transmission) so that interference to the reporting UEs may be suitably reduced.

CDI quantization may follow the same general principles as Precoding Matrix Indication (PMI) quantization specified in the LTE Release 8, although a higher accuracy may be required. In addition to the CDI, a UE may also report a tentative PMI of its serving cell. Such a tentative PMI may be used by the receiving cell to assess interference caused to its own UEs and subsequently for refining selection of a served UE. Each SFI message may further comprise another PMI to be utilized at the receiving cell for the adjustment of its beam direction for data transmission.

The SFI report may also include information about a utility, such as a quantized projected utility or a short-term projected utility relative to a long-term projected utility updated over the backhaul. This utility may be associated with the tentative assignment for the target cell to assess the utility of "yielding" to this particular UE versus yielding to other UE(s) and/or choosing not to cooperate with the received request by choosing to use a non-cooperative beam to serve its own UEs.

Upon reception of SFI from neighboring UEs, receiving eNBs may refine their scheduling decisions and make final transmit power and beam decisions for target subframes. These decisions may be reflected in C/1 measurements performed subsequently by UEs that are considered for scheduling and reported by these UEs to their serving cells.

As illustrated in FIG. 5C, each cell may transmit a reference signal which reflects transmit power spectrum density (PSD) level and beam direction to be used on a corresponding set of resources on which a downlink transmission with these PSD and beam direction may take place in the target subframe. This reference signal can be referred as a Resource Quality Indication Reference Signal (RQI-RS) as it may be used for measuring channel quality observed by a UE on a specific set of resources. Such a RQI-RS may comprise a small set of Resource Elements (REs) associated with a resource unit in every subframe, and may be used to measure signal and interference (plus noise) energy corresponding to this resource unit.

A suitable choice of resource unit may depend on the desired granularity of interference coordination, e.g., 1.08 MHz or 5 MHz. It should be noted that all cells may broadcast RQI-RS for all resource units on the same set or resource specific REs and may use different cell specific scrambling. Then, a UE may measure the signal component by using its serving cell scrambling code and it may treat the remaining energy as interference plus noise. Such a design may allow for an accurate measurement of resource specific channel conditions with a small overhead (approximately of 1%) depending on the desired resource granularity.

Concurrently with transmitting RQI-RS, each cell may transmit a request to send Resource Quality Indication (RQI-REQ) to a pre-selected set of UEs, as it is also illustrated in FIG. 5C. The transmitted RQI-REQ message may identify UE(s) expected to report Resource Quality Indication (RQI) corresponding to a resource unit indicated in the RQI-REQ. It should be noted that the set of UEs targeted by the RQI-REQ may differ from the initial set of tentatively scheduled UEs as it is refined based on SFIs received from UEs in neighboring cells. Each UE that receives RQI-REQ for a set of resources may report (short-term) channel quality corresponding to this set of resources based on the corresponding RQI-RS. A cell may request multiple UEs to report RQI corresponding to the same set of resources so the cell can make opportunistic scheduling decision based on all channel quality reports.

In the example illustrated in FIG. 5, the $Cell_1$ and $Cell_2$ may tentatively choose the $UE_{1,1}$ and $UE_{2,1}$ and send SFI-REQ 502 and SFI-REQ 504 accordingly. The utility level indicated in the SFI-REQ 502 of the $Cell_1$ may exceed the utility level indicated in the SFI-REQ 504 of the $Cell_2$. Hence, upon reception of SFI 506 from the $UE_{1,1}$, the $Cell_2$ may yield to the $Cell_1$ based on comparison of the sent/received priorities, and likewise the $Cell_1$ may not yield to the $Cell_2$. Consequently, the $Cell_1$ may choose a beam direction towards the $UE_{1,1}$ and may transmit RQI-RS 508 accordingly while transmitting RQI-REQ 510 to the $UE_{1,1}$.

Conversely, a scheduler of the $Cell_2$ may decide to schedule the $UE_{2,2}$ that is not affected by interference from the $Cell_1$, rather than the initially selected $UE_{2,1}$. Hence, the $Cell_2$ may choose a transmit beam that suitably trades between interference reduction to the $UE_{1,1}$ and precoding gain to the served $UE_{2,2}$ wherein a suitable tradeoff may be established based on projected utilities of the corresponding scheduling decisions. At the same time, the $Cell_2$ may transmit RQI-REQ 512 to the UE$_{2,2}$. Upon reception of RQI reports 514 and 516 from the UE$_{1,1}$ and UE$_{2,2}$ respectively, the Cell$_1$ and Cell$_2$ may make respective scheduling decisions and select a modulation-coding scheme (MCS) subject to the reported channel quality, and may issue downlink grants accordingly.

The described procedure can be also applied in the case when each cell is equipped with only a single transmit antenna. In this case, the response of a cell receiving SFI may be limited to a change of the transmit power based on the utility information contained in the SFI. In one aspect of the present disclosure, the cell receiving the SFI may choose not to schedule its own UE (or schedule it at a lower power) if the utility gain indicated in the received SFI is higher than the utility obtained by scheduling this UE. In another aspect, if the utility of scheduling its own UE is higher, then the cell may choose to ignore the receiving SFI. For certain aspects, the SFI may ask the interfering cell to reduce transmit power even if this cell is equipped with multiple transmit antennas. This is the case, for example, in a high mobility scenario, where the latency of delivering the SFI may render a preferred beam direction meaningless.

According to an example timeline from FIG. 6 that corresponds to the interference coordination sequence illustrated in FIG. 5, there may be two to four subframe spacing between the consecutive steps thereby allowing sufficient processing time at both end of the link. The total delay of 8-16 subframes may exist between the initial (tentative) assignment and grant/data (i.e., Physical Downlink Shared Channel (PDSCH)) transmission. It should be noted, however, that SFI-REQ and SFI transmission may be avoided in an opportunistic scheduling setup when cooperation is limited to interference-aware scheduling by a serving cell.

This approach may be adequate in WWAN deployment scenarios when the number of active UEs is relatively large and hence opportunistic scheduling may offer a significant fraction of cooperation gain and avoiding the extra overhead of SFI-REQ/SFI is desirable. In this case, the overall delay of interference aware scheduling may be limited to 4-8 subframes. However, SFI-based coordination may be dependable in scenarios with harsh interference conditions (e.g., the CSG) and with a limited number of active UEs where the lack of multi-user diversity along with the presence of strong dominant interferers may require explicit interference mitigation by the transmitter. The SFI-based coordination may be also beneficial to high mobility UEs as it may allow for silencing a dominant interferer, which may be the only mechanism of interference reduction in high mobility scenarios.

Moreover, as mentioned previously, interference coordination may be carried out over the backhaul X2 interface in cases when the backhaul is reliable and an X2 interface is available. In this case, CDI of the target (interfering) cells may be reported over-the-air to the serving cell and forwarded to the target cells over the backhaul. CDI transmission to the serving cell may be poll-based (e.g., following SFI-REQ) or based on periodic reports in the case of low mobility and/or correlated transmit antennas. In such cases, the overhead of SFI-REQ/SFI signaling may also be avoided. Over-the-air SFI transmission to the target cell may be desirable in cases of insufficient backhaul provisioning for inter-node control, such as HeNB deployments. It should be noted that the overall uplink overhead may be less of concern in such scenarios due to a limited number of active UEs.

Certain aspects of the present disclosure support various UE reports and corresponding requests by the serving cell to enable efficient interference coordination in various deployment scenarios. RQI-RS and poll-based RQI reporting to the serving cell may be implemented to enable opportunistic spatial interference avoidance and accurate rate prediction across a broad range of deployment scenarios. Additionally, explicit over-the-air cooperation request sent by UEs to their potential (dominant) interferers may allow for substantial gains in some deployment scenarios such as CSG HeNB deployments. The proposed design may offer flexibility of enabling various reports thereby trading off between coordinated multi-point gains and the amount of control overhead depending on a deployment scenario.

Figure 7:
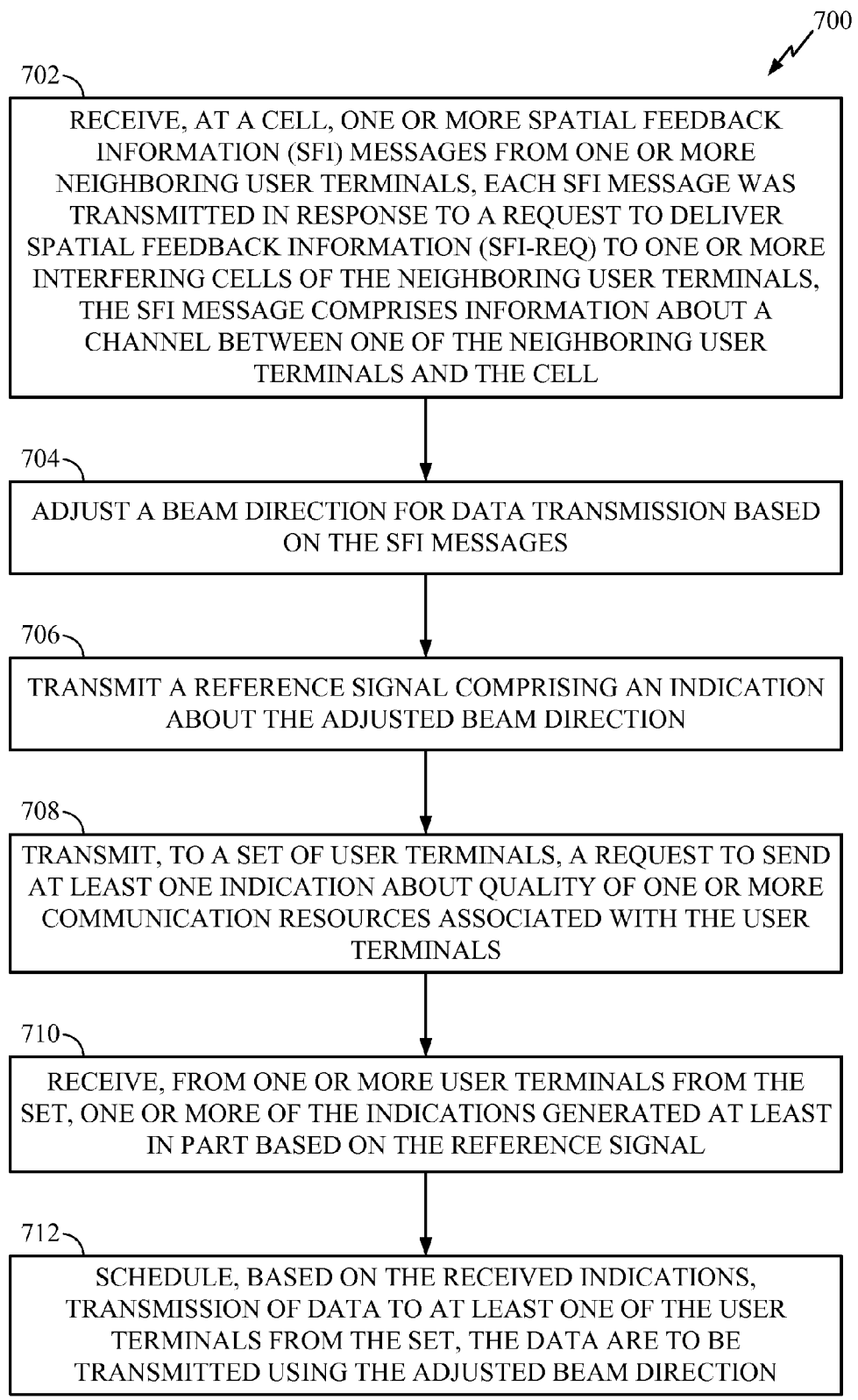
FIG. 7 illustrates example operations that may be performed at a cell site to achieve coordinated downlink transmissions in accordance with certain aspects of the present disclosure.

FIG. 7 illustrates example operations 700 that may be performed at a cell site to achieve coordinated downlink transmissions in accordance with certain aspects of the present disclosure. At 702, the cell may receive one or more Spatial Feedback Information (SFI) messages from one or more neighboring user terminals, each SFI message may be transmitted in response to a Request to deliver Spatial Feedback Information (SFI-REQ) to one or more interfering cells of the neighboring user terminals, the SFI message may comprise information about a channel between one of the neighboring user terminals and the cell. At 704, a beam direction for data transmission may be adjusted based on the SFI messages. At 706, the cell may transmit a reference signal that comprises an indication about the adjusted beam direction.

Figure 8:
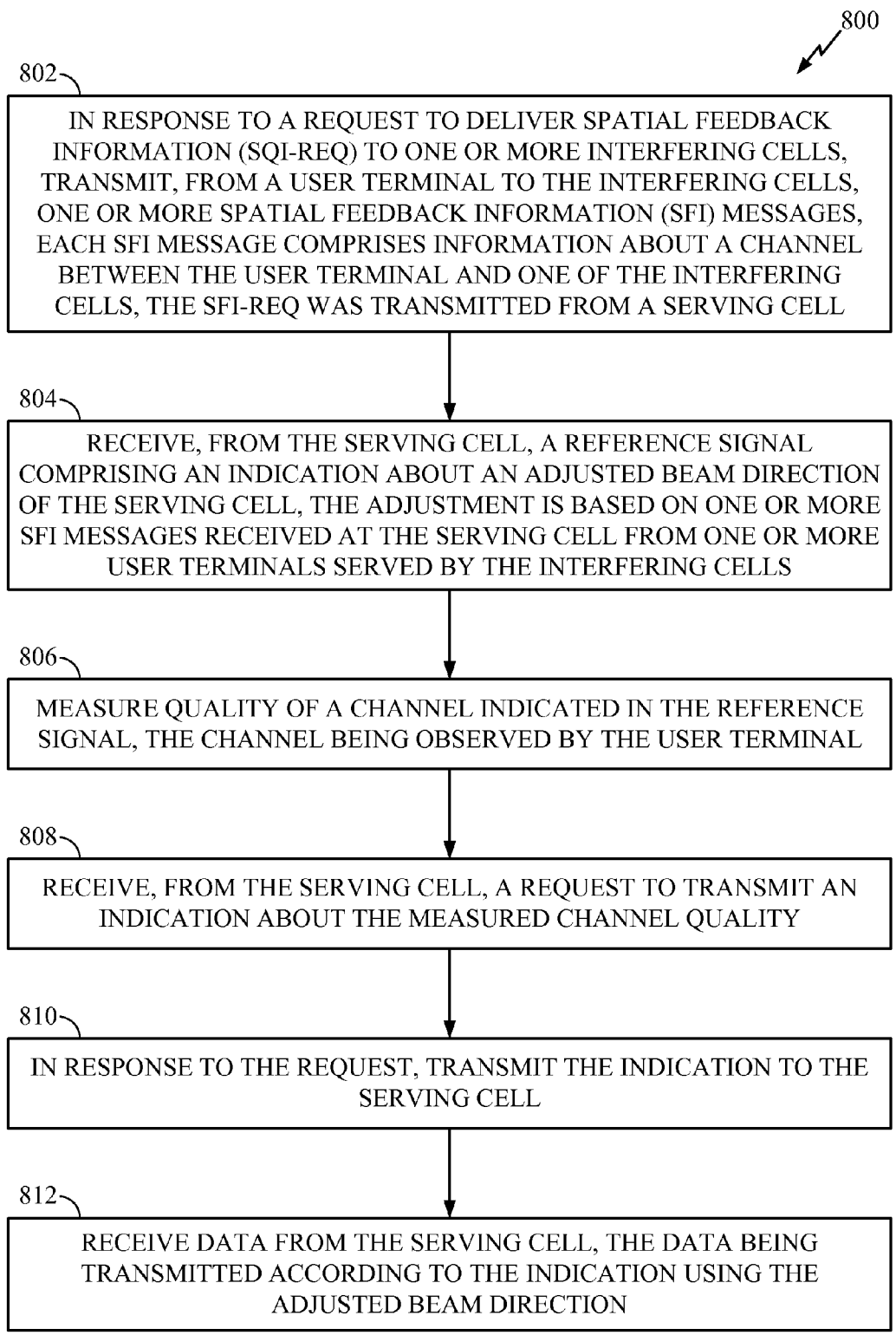
FIG. 8 illustrates example operations of signaling that may be performed at a user terminal to support coordinated downlink transmissions in accordance with certain aspects of the present disclosure.

At 708, the cell may transmit, to a set of user terminals, a request to send at least one indication message about quality of one or more communication resources associated with the user terminals. At 710, the cell may receive, from one or more user terminals from the set, one or more of the indication messages generated at least in part based on the reference signal. At 712, the cell may schedule, based on the received indication messages, transmission of data to one of the user terminals from the set, the data may be transmitted using the adjusted beam direction FIG. 8 illustrates example operations 800 for signaling that may be performed at a user terminal to support coordinated downlink transmissions in accordance with certain aspects of the present disclosure. At 802, in response to a Request to deliver Spatial Feedback Information (SFI-REQ) to one or more interfering cells, the user terminal may transmit one or more SFI messages, each SFI message may comprise information about a channel between the user terminal and one of the interfering cells, the SFI-REQ may be transmitted from a serving cell of the user terminal. At 804, the user terminal may receive, from the serving cell, a reference signal comprising an indication about an adjusted beam direction of the serving cell, the adjustment is based on one or more SFI messages received at the serving cell from one or more user terminals served by the interfering cells.

At 806, quality of a channel indicated in the reference signal may be measured, the channel being observed by the user terminal. At 808, the user terminal may receive, from the serving cell, a request to transmit an indication about the measured quality of channel. At 810, in response to the request, the user terminal may transmit the indication to the serving cell. At 812, the user terminal may receive data from the serving cell, the data being transmitted according to the indication using the adjusted beam direction.

Simulation Results

Presented simulation results highlight fairness gains achievable due to spatial interference coordination in the HeNB deployments. For example, a HeNB deployment model with a single building in every drop can be considered. Every apartment may have a HeNB with an associated UE, while only 20% randomly chosen HeNB/UE pairs can be active in any drop. All UEs may be equipped with two receive antennas, and each HeNB may be equipped with either two or four transmit antennas. Frequency flat Rayleigh independent and identically distributed (i.i.d.) fading can be considered across all transmit/receive antennas with independent block fading in time. Specifically, as illustrated in FIG. 6, channel fade may remain constant throughout every instance of the spatial coordination timeline, however, it may change in i.i.d. fashion across the instances.

This particular modeling may provide accurate assessment of the long-term throughput in the HeNB deployments where coordination latency (16 ms in this example) may not affect coordination accuracy given a low UE mobility. The UE may utilize a spatial minimum mean square error (MMSE) MIMO technique. The resulting spectral efficiency can be computed as 64QAM information rate while implementation losses can be modeled by a 3 dB gap to channel capacity. No overhead is accounted in spectral efficiency calculation.

The baseline results correspond to a conventional single-cell scheduling without interference coordination. Specifically, every active HeNB may schedule its UE at every scheduling instance via eigen-beamforming with equal power distribution across layers, while rank selection may be based on the maximum spectral efficiency.

In the presence of interference coordination, the timeline illustrated in FIG. 6 may be followed, wherein decisions to issue spatial coordination requests (SFI) as well as subsequent scheduling decisions may be carried out based on the notion of the serving utility. A local utility of serving a particular UE can be defined according to the long-term proportional fairness, hence as ratio of the predicted instantaneous spectral efficiency to the total amount of data served so far to the UE. Likewise, a cumulative utility of simultaneously serving multiple UEs by their serving HeNBs can be defined as a sum of the respective local utilities. The entire coordination process may be carried out in three steps explained below in details.

In the first step, every HeNB may decide to use spatial coordination based on short-term channel and long-term interference of a served UE. Serving HeNB may issue SFI-REQ to the UE targeting a number of interfering HeNBs in the order of dominance whenever the utility of serving the UE corresponding to a reduced interference with rank-one transmission exceeds the utility of the rank-two (MIMO) transmission. The UE that receives SFI-REQ targeting one or more HeNBs may send SFI to these HeNBs. Each SFI request may carry tentative PMI for the downlink transmission of the originating HeNB, a spatial direction (e.g., CDI) from the UE to the target HeNB and additional information required to access the impact of interfering beam on the local utility of the UE. An example of such information would be the target C/I of the UE as well as the value of target interference level. The maximum number of SFI per UE can be considered to be 1, 2 and 3. The UE may only send SFI to HeNB whose long-term downlink strength is within 10 dB from the serving HeNB.

In the second step of the coordination process, upon reception of SFIs from neighboring UEs, each HeNB may perform a pair-wise comparison of local utilities carried in the SFIs with its own local utility. The HeNB may grant every SFI whose local utility exceeds its own. The implications of such a grant may be two-fold: the HeNB may account for CDI contained in every granted SFI when calculating candidate transmit beams, and the HeNB may choose a beam based on the maximum cumulative utility including its served UE and neighboring users whose SFIs are granted. A HeNB that does not receive any SFI or grants none of the received SFIs may utilize eigen-beamforming (EBF). On the other hand, a HeNB that receives one or more SFIs may consider two additional transmit options: a coordinated silencing (CS) and a signal-to-leakage ratio (SLR) beamforming.

The CS may correspond to no transmission by the serving HeNB for the sake of interfered UEs. In the case of SLR beamforming, for every (MIMO) stream of the served UE, a beam may be found that attempts to maximize ratio of the energy received along an eigen-direction of the corresponding stream to the sum of interference energies observed at the interfered UEs along the CDI information weighted by inverses of their signal strength.

As explained above, the HeNB may choose between the EBF, CS and SLR transmission based on the maximum cumulative utility across all neighboring UEs with granted SFIs, which represent the served UEs. Each HeNB may also decide on the set of UEs to be polled (via RQI-REQ) in order to feed back RQI subject to a constraint on the number of RQI-REQ and RQI messages. The set of UEs polled for RQI may be chosen among all the UEs associated with the HeNB based on the maximum local utility subject to the chosen transmission scheme of the HeNB. In addition, the set of UEs may be selected according to the anticipated interference based on tentative PMIs reported in the granted SFI messages and long-term interference from all HeNBs whose SFIs are not received or not granted. In this simulation setting, only one UE may be associated with every node hence the number of RQI may be set to one. Finally, each HeNB may transmit RQI-RS consistent with the selected transmission strategy and may issue RQI-REQ.

In the third step of the coordination process, the final selection of UE and MCS may be based on RQI reports that reflect accurate C/I for all UEs that have been polled, as well as based on regular CQI reports for the remaining UEs. In this simulation, the HeNB may schedule its only UE unless the CS is chosen.

Figure 9:
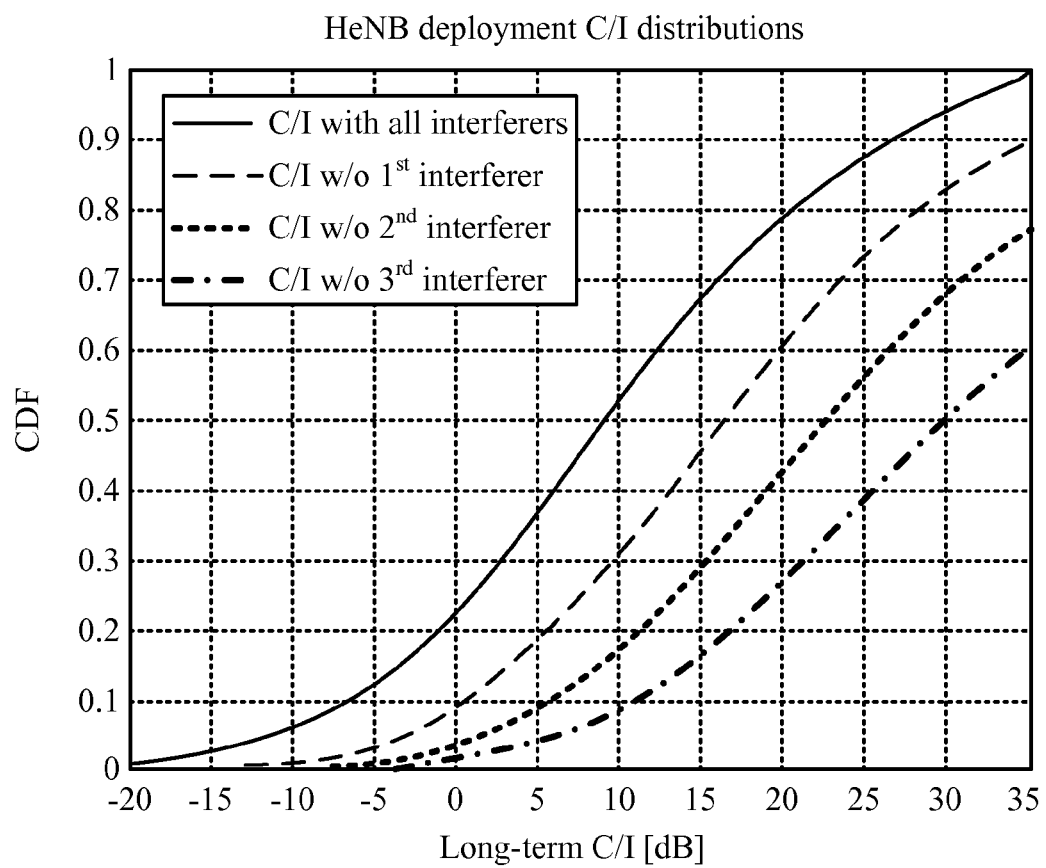
FIG. 9 illustrates an example long-term carrier-to-interference (C/I) distribution with different number of removed interferers in accordance with certain aspects of the present disclosure.

In FIG. 9, a long-term C/I distribution with different number of removed dominant interferes is plotted. In the absence of interference coordination (i.e., all interferers are present), around 10% of UEs may observe the C/I below −7.5 dB. Removal of only the main dominant interferer (e.g., one SFI per UE) may improve the 5% tail by around 7.5 dB, while allowing for up to three SFIs per UE may yield over 17 dB of potential improvement in the tail value. Hence, spatial interference coordination suggests possibility of a substantial improvement in tail throughput of HeNB deployments.

Figure 10B:
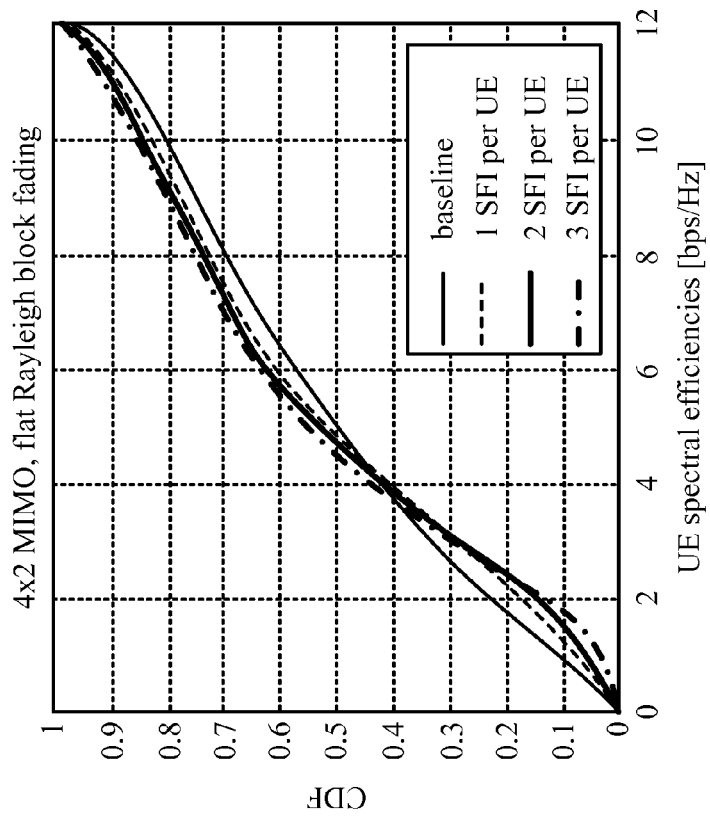
FIG. 10 illustrates an example spectral efficiency per user with different settings of spatial feedback information reports per user in accordance with certain aspects of the present disclosure.
Figure 10A:
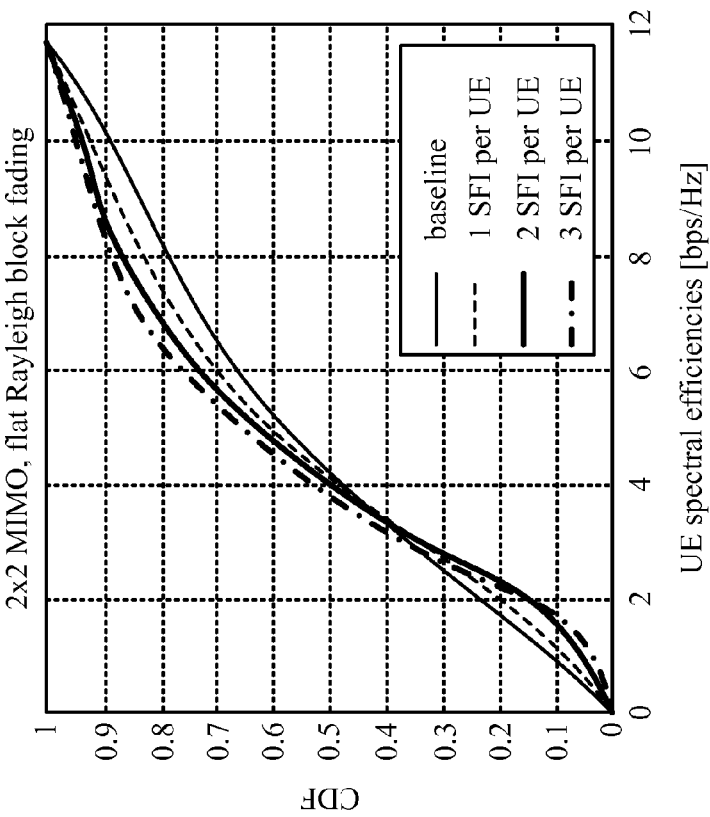

Cumulative distribution of UE throughputs with the baseline (uncoordinated) scheduling and spatial coordination with different constraint on the maximum number of SFI per UE is illustrated in FIG. 10 for the case of two (FIG. 10A) and four transmit antennas (FIG. 10B) at the HeNB. It should be noted that spatial coordination with up to three SFIs per UE may allow for over 100% gain in the 10% tail spectral efficiency over the baseline at the expense of a moderate loss in the region of high spectral efficiencies, namely within around 25% and 12% in the case of two and four transmit antennas, respectively.

Figure 11A:
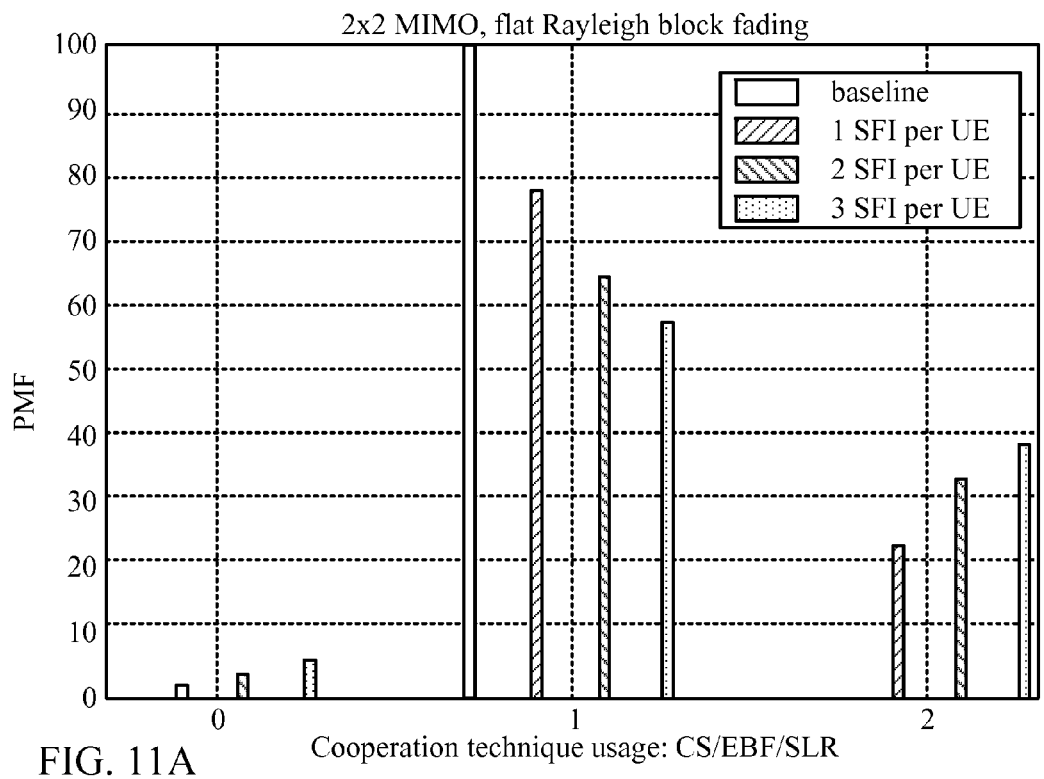
FIG. 11 illustrates an example of relative frequency of different transmission techniques in accordance with certain aspects of the present disclosure.
Figure 11B:
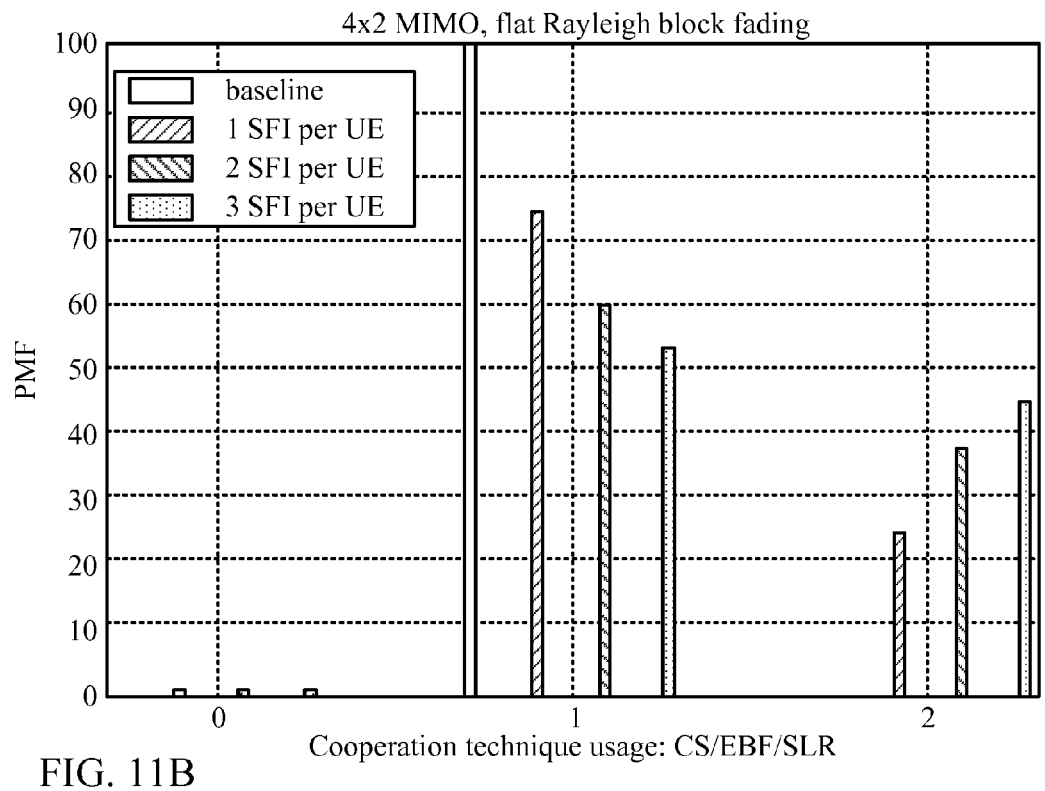

FIG. 11 illustrates relative frequency of different transmit beamforming strategies for two (FIG. 11A) and four (FIG. 11B) transmit antennas. It should be noted that the baseline may always utilize the eigen-beamforming, while coordinated transmission may usually employ the SLR beamforming and infrequently the CS. The total number of SLR and CS occurrences may correspond to the instances where the HeNB grants one or more SFIs received from UEs in the neighboring cells. Also, the CS may almost never occur in the case of four transmit antennas per HeNB as enough degrees of freedom may be available to accommodate transmit interference nulling to the neighbors, as well as the MIMO transmission to the served UE.

Figure 12A:
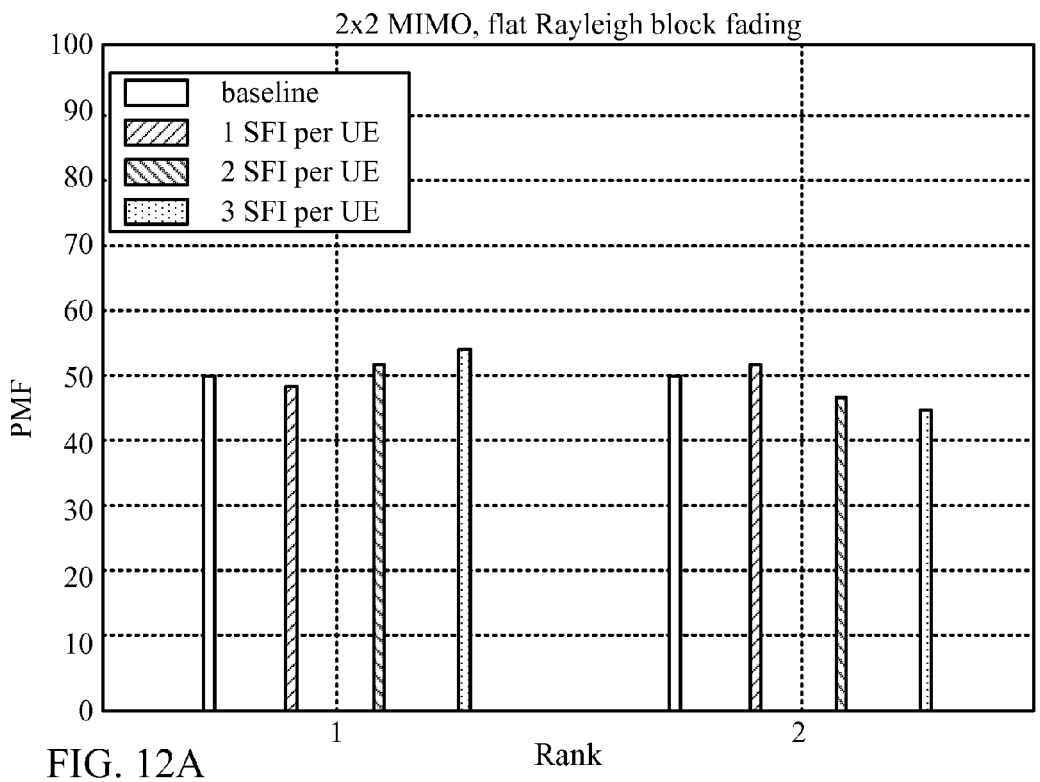
FIG. 12 illustrates an example relative frequency of different rank values in accordance with certain aspects of the present disclosure.
Figure 12B:
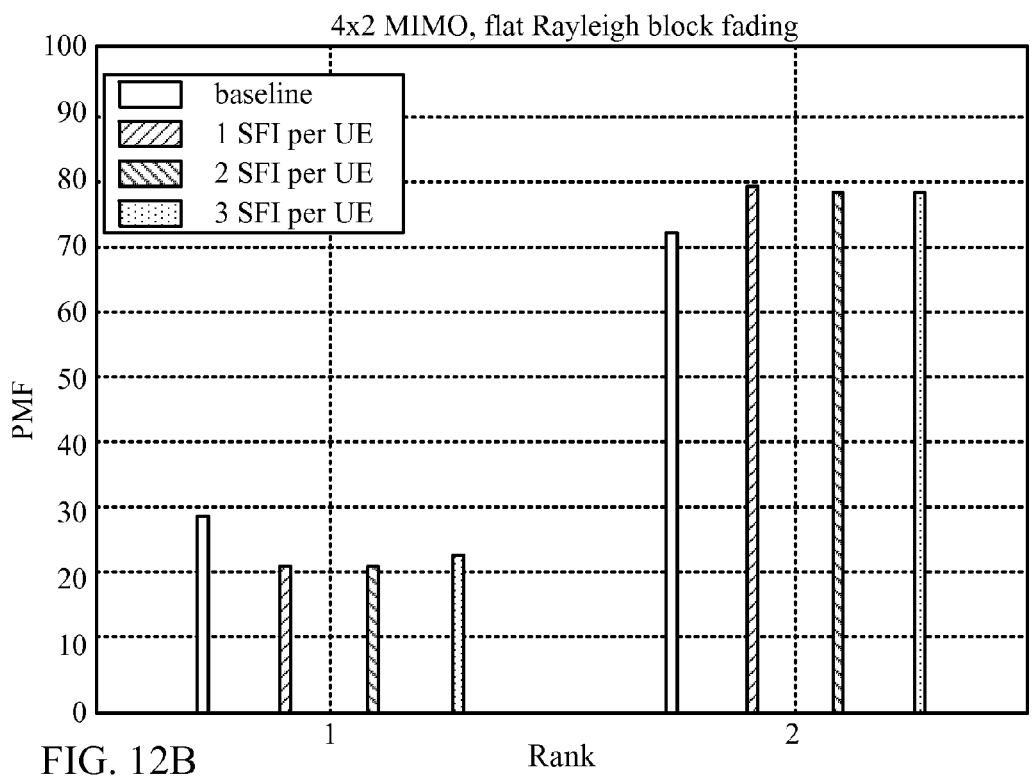

FIG. 12 illustrates relative frequency of rank values observed in the abovementioned simulations. It should be noted that spatial coordination with possibly more than one SFI per UE may yield a slight decline in rank values with two transmit antennas per UE mainly caused by spatial constraints enforced by SFIs. On the other hand, spatial coordination may yield increase in rank when the number of transmit antennas equals to four. This may be due to the ability of granting HeNBs to accommodate neighbor's SFIs along with rank two transmissions to the served UEs, as well as due to offering higher rank values more often to the UEs that issue SFIs.

Figure 7A:
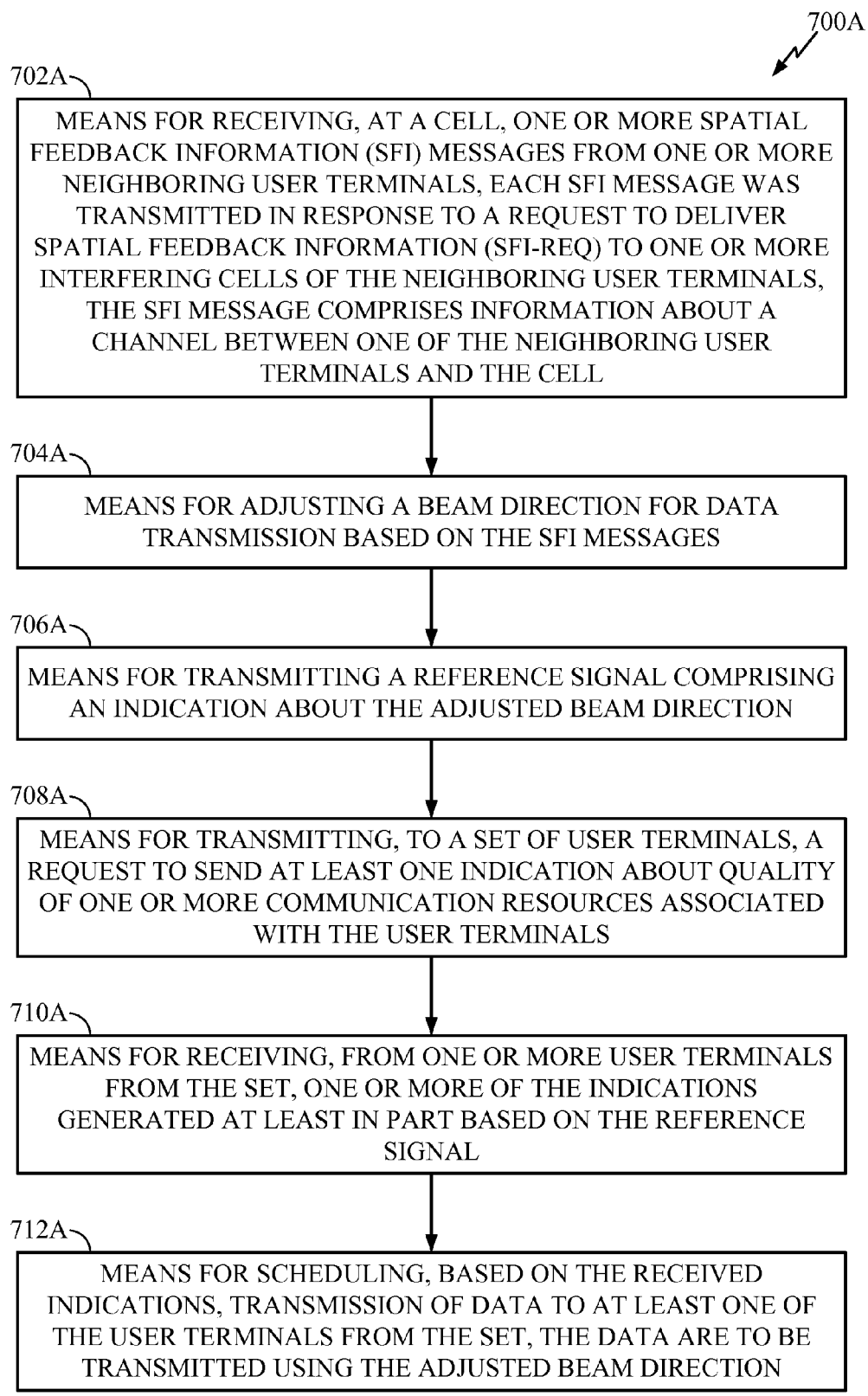
FIG. 7A illustrates example components capable of performing the operations illustrated in FIG. 7.
Figure 8A:
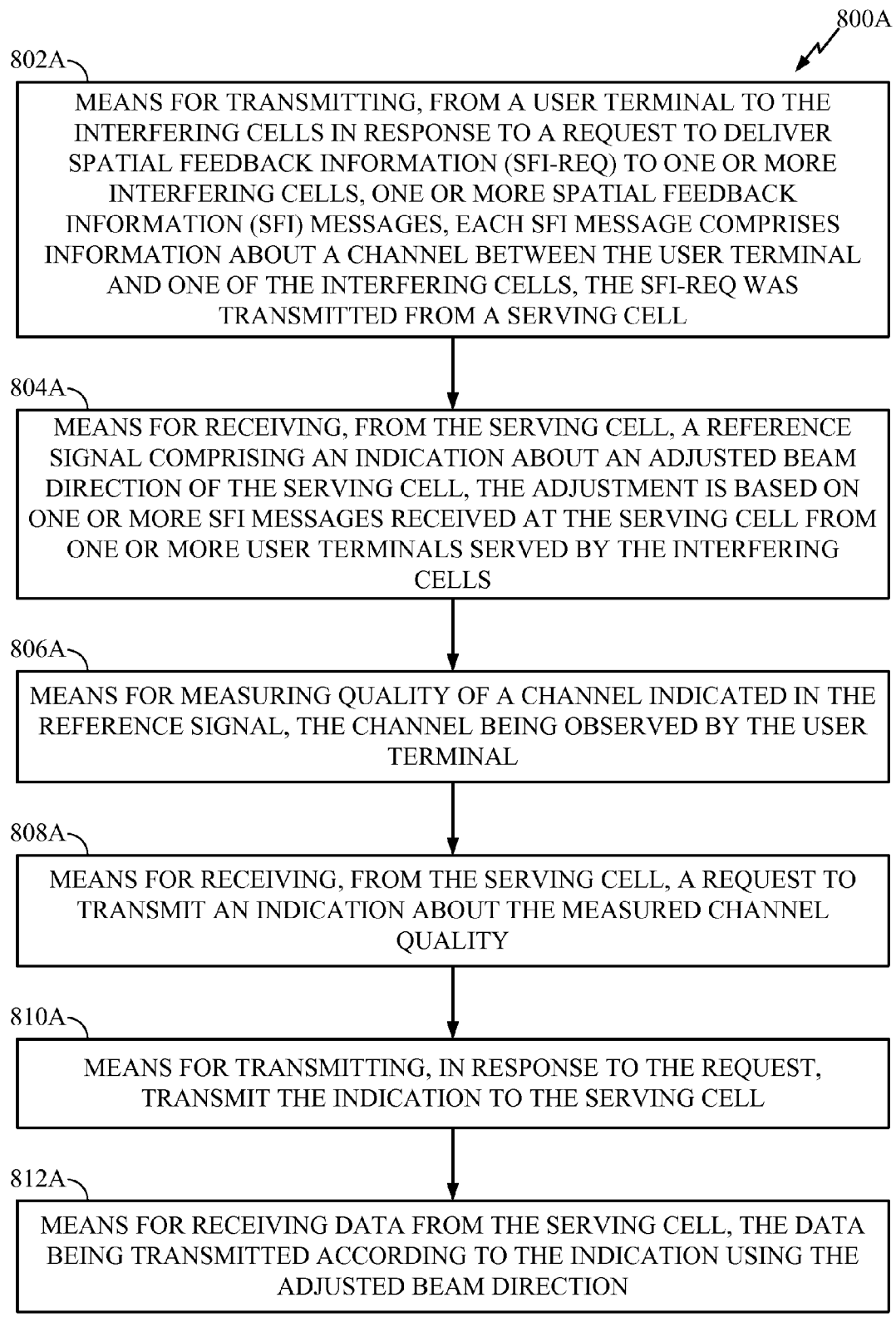
FIG. 8A illustrates example components capable of performing the operations illustrated in FIG. 8.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, operations 700 and 800, illustrated in FIGS. 7 and 8 correspond to components 700A and 800A illustrated in FIGS. 7A and 8A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. A method for wireless communications, comprising:
   receiving, at a cell, one or more Spatial Feedback Information (SFI) messages from one or more user terminals served by a neighboring cell, wherein each SFI message was transmitted in response to a Request by the neighboring cell to deliver Spatial Feedback Information (SFI-REQ) to one or more interfering cells of the user terminals, and wherein the SFI message comprises information about a channel between one of the user terminals and the cell; and
   adjusting at least one of a beam direction or a power for data transmission based on the SFI messages.

2. The method of claim 1, further comprising:
   transmitting a reference signal comprising an indication about the adjusted beam direction;
   transmitting, to a set of user terminals, a request to send at least one indication message about quality of one or more communication resources associated with the user terminals;
   receiving, from one or more user terminals from the set, one or more of the indication messages generated at least in part based on the reference signal; and
   scheduling, based on the received indication messages, transmission of data to at least one of the user terminals from the set, the data are to be transmitted using the adjusted beam direction.

3. The method of claim 1, wherein the SFI-REQ comprises at least one of: an indication about the interfering cells, an indication about frequency resources on which a user terminal of the user terminals served by the neighboring cell that receives the SFI-REQ is pre-scheduled, or a scheduling priority of the user terminal.

4. The method of claim 1, wherein each SFI message comprises a quantized spatial direction of the channel.

5. The method of claim 4, wherein each SFI message further comprises at least one of: a Precoding Matrix Indication (PMI) corresponding to the channel, or another PMI to be used at the cell for adjusting the beam direction.

6. The method of claim 1, wherein:
   each SFI message comprises a Precoding Matrix Indication (PMI) associated with the neighboring cell serving a user terminal transmitting the SFI message, and the method further comprising:
   refining, based on the PMI, selection of a user terminal to be served by the cell.

7. The method of claim 1, wherein each SFI message comprises a utility associated with assignment for the cell to assess yielding or not yielding to the neighboring cells serving the one or more user terminals.

8. The method of claim 1, further comprising:
   refining a schedule of data transmissions based on the SFI messages.

9. An apparatus for wireless communications, comprising:
   a receiver configured to receive one or more Spatial Feedback Information (SFI) messages from one or more user terminals served by a neighboring cell, wherein each SFI message was transmitted in response to a Request by the neighboring cell to deliver Spatial Feedback Information (SFI-REQ) to one or more interfering cells of the user terminals, and wherein the SFI message comprises information about a channel between one of the user terminals and the apparatus; and
   a circuit configured to adjust at least one of a beam direction or a power for data transmission based on the SFI messages.

10. The apparatus of claim 9, further comprising:
    a transmitter configured to transmit a reference signal comprising an indication about the adjusted beam direction, wherein
    the transmitter is also configured to transmit, to a set of user terminals, a request to send at least one indication message about quality of one or more communication resources associated with the user terminals, and
    the receiver is also configured to receive, from one or more user terminals from the set, one or more of the indication messages generated at least in part based on the reference signal; and
    a scheduler configured to schedule, based on the received indication messages, transmission of data to at least one of the user terminals from the set, the data are to be transmitted using the adjusted beam direction.

11. The apparatus of claim 9, wherein the SFI-REQ comprises at least one of: an indication about the interfering cells, an indication about frequency resources on which a user terminal of the user terminals served by the neighboring cell that receives the SFI-REQ is pre-scheduled, or a scheduling priority of the user terminal.

12. The apparatus of claim 9, wherein each SFI message comprises a quantized spatial direction of the channel.

13. The apparatus of claim 12, wherein each SFI message further comprises at least one of: a Precoding Matrix Indication (PMI) corresponding to the channel, or another PMI to be used at the apparatus for adjusting the beam direction.

14. The apparatus of claim 9, wherein:
    each SFI message comprises a Precoding Matrix Indication (PMI) associated with the neighboring cell serving a user terminal transmitting the SFI message, and the apparatus further comprising:
    another circuit configured to refine, based on the PMI, selection of a user terminal to be served by the apparatus.

15. The apparatus of claim 9, wherein each SFI message comprises a utility associated with assignment for the apparatus to assess yielding or not yielding to the neighboring cell serving the one or more user terminals.

16. The apparatus of claim 9, further comprising:
    another circuit configured to refine a schedule of data transmissions based on the SFI messages.

17. An apparatus for wireless communications, comprising:
    means for receiving one or more Spatial Feedback Information (SFI) messages from one or more user terminals served by a neighboring cell, wherein each SFI message was transmitted in response to a Request by the neighboring cell to deliver Spatial Feedback Information (SFI-REQ) to one or more interfering cells of the user terminals, and wherein the SFI message comprises information about a channel between one of the user terminals and the apparatus; and
    means for adjusting at least one of a beam direction or a power for data transmission based on the SFI messages.

18. The apparatus of claim 17, further comprising:
    means for transmitting a reference signal comprising an indication about the adjusted beam direction;
    means for transmitting, to a set of user terminals, a request to send at least one indication message about quality of one or more communication resources associated with the user terminals;

means for receiving, from one or more user terminals from the set, one or more of the indication messages generated at least in part based on the reference signal; and means for scheduling, based on the received indication messages, transmission of data to at least one of the user terminals from the set, the data are to be transmitted using the adjusted beam direction.

19. A computer-program product for wireless communications, comprising a non-transitory computer readable medium having instructions stored thereon, the instructions being executable by one or more processors and the instructions comprising:

instructions for receiving, at a cell, one or more Spatial Feedback Information (SFI) messages from one or more user terminals served by a neighboring cell, wherein each SFI message was transmitted in response to a Request by the neighboring cell to deliver Spatial Feedback Information (SFI-REQ) to one or more interfering cells of the user terminals, and wherein the SFI message comprises information about a channel between one of the user terminals and the cell; and instructions for adjusting at least one of a beam direction or a power for data transmission based on the SFI messages.

20. The computer-program product of claim 19, wherein the instructions further comprise:

instructions for transmitting a reference signal comprising an indication about the adjusted beam direction;

instructions for transmitting, to a set of user terminals, a request to send at least one indication message about quality of one or more communication resources associated with the user terminals;

instructions for receiving, from one or more user terminals from the set, one or more of the indication messages generated at least in part based on the reference signal; and instructions for scheduling, based on the received indication messages, transmission of data to at least one of the user terminals from the set, the data are to be transmitted using the adjusted beam direction.

21. An apparatus for wireless communications, comprising:

at least one processor configured to:
receive one or more Spatial Feedback Information (SFI) messages from one or more user terminals served by a neighboring cell, wherein each SFI message was transmitted in response to a Request by the neighboring cell to deliver Spatial Feedback Information (SFI-REQ) to one or more interfering cells of the user terminals, and wherein the SFI message comprises information about a channel between one of the user terminals and the apparatus, and adjust at least one of a beam direction or a power for data transmission based on the SFI messages; and a memory coupled to the at least one processor.

22. The apparatus of claim 21, wherein the processor is further configured to:

transmit a reference signal comprising an indication about the adjusted beam direction;

transmit, to a set of user terminals, a request to send at least one indication message about quality of one or more communication resources associated with the user terminals;

receive, from one or more user terminals from the set, one or more of the indication messages generated at least in part based on the reference signal; and schedule, based on the received indication messages, transmission of data to at least one of the user terminals from the set, the data are to be transmitted using the adjusted beam direction.

23. A method for wireless communications, comprising:

in response to a Request to deliver Spatial Feedback Information (SFI-REQ) to one or more interfering cells, transmitting, from a user terminal to the interfering cells, one or more Spatial Feedback Information (SFI) messages, wherein each SFI message comprises information about a channel between the user terminal and one of the interfering cells, and wherein the SFI-REQ was transmitted from a serving cell of the user terminal; and receiving, from the serving cell, a reference signal comprising an indication about an adjusted beam direction of the serving cell, wherein the adjustment is based on one or more SFI messages received at the serving cell from one or more user terminals served by the interfering cells.

24. The method of claim 23, further comprising:

measuring quality of a channel indicated in the reference signal, the channel being observed by the user terminal;

receiving, from the serving cell, a request to transmit an indication about the measured channel quality; and in response to the request, transmitting the indication to the serving cell.

25. The method of claim 24, further comprising:

receiving data from the serving cell, the data being transmitted according to the indication using the adjusted beam direction.

26. The method of claim 23, further comprising:

receiving, from the one or more interfering cells, one or more other reference signals;

measuring, based on the other reference signals, a level of interference observed at the user terminal; and measuring, based on the reference signal and the level of interference, quality of a channel between the serving cell and the user terminal.

27. The method of claim 23, wherein the SFI-REQ comprises at least one of: an indication about the interfering cells, an indication about frequency resources on which the user terminal is pre-scheduled, or information about a scheduling priority of the user terminal.

28. The method of claim 23, wherein each SFI message comprises a quantized spatial direction of the channel.

29. The method of claim 28, wherein each SFI message further comprises at least one of: a Precoding Matrix Indication (PMI) corresponding to the channel, or another PMI to be used at the cell for adjusting the beam direction.

30. The method of claim 23, wherein:

each SFI message comprises a Precoding Matrix Indication (PMI) associated with the serving cell, and selection of a user terminal to be served by one of the interfering cells receiving the SFI message is refined based on the PMI.

31. The method of claim 23, wherein each SFI message comprises a utility associated with assignment for the serving cell to assess yielding or not yielding to the one or more interfering cells serving the user terminals.

32. An apparatus for wireless communications, comprising:

a transmitter configured to transmit, to one or more interfering cells in response to a Request to deliver Spatial Feedback Information (SFI-REQ) to the interfering cells, one or more Spatial Feedback Information (SFI) messages, wherein each SFI message comprises information about a channel between the apparatus and one of the interfering cells, and wherein the SFI-REQ was transmitted from a serving cell of the apparatus; and
a receiver configured to receive, from the serving cell, a reference signal comprising an indication about an adjusted beam direction of the serving cell, wherein the adjustment is based on one or more SFI messages received at the serving cell from one or more user terminals served by the interfering cells.

33. The apparatus of claim 32, further comprising
a circuit configured to measure quality of a channel indicated in the reference signal, the channel being observed by the apparatus, wherein
the receiver is also configured to receive, from the serving cell, a request to transmit an indication about the measured channel quality, and
the transmitter is also configured to transmit the indication to the serving cell in response to the request.

34. The apparatus of claim 33, wherein
the receiver is also configured to receive data from the serving cell, the data being transmitted according to the indication using the adjusted beam direction.

35. The apparatus of claim 32, wherein:
the receiver is also configured to receive, from the one or more interfering cells, one or more other reference signals, and the apparatus further comprising
a circuit configured to measure, based on the other reference signals, a level of interference observed at the apparatus, wherein
the circuit is also configured to measure, based on the reference signal and the level of interference, quality of a channel between the serving cell and the apparatus.

36. The apparatus of claim 32, wherein the SFI-REQ comprises at least one of: an indication about the interfering cells, an indication about frequency resources on which the apparatus is pre-scheduled, or information about a scheduling priority of the apparatus.

37. The apparatus of claim 32, wherein each SFI message comprises a quantized spatial direction of the channel.

38. The apparatus of claim 37, wherein each SFI message further comprises at least one of: a Precoding Matrix Indication (PMI) corresponding to the channel, or another PMI to be used at the cell for adjusting the beam direction.

39. The apparatus of claim 32, wherein:
each SFI message comprises a Precoding Matrix Indication (PMI) associated with the serving cell, and
selection of a user terminal to be served by one of the interfering cells receiving the SFI message is refined based on the PMI.

40. The apparatus of claim 32, wherein each SFI message comprises a utility associated with assignment for the serving cell to assess yielding or not yielding to the one or more interfering cells serving the apparatus.

41. An apparatus for wireless communications, comprising:
means for transmitting, to one or more interfering cells in response to a Request to deliver Spatial Feedback Information (SFI-REQ) to the interfering cells, one or more Spatial Feedback Information (SFI) messages, wherein each SFI message comprises information about a channel between the apparatus and one of the interfering cells, and wherein the SFI-REQ was transmitted from a serving cell of the apparatus; and
means for receiving, from the serving cell, a reference signal comprising an indication about an adjusted beam direction of the serving cell, wherein the adjustment is based on one or more SFI messages received at the serving cell from one or more user terminals served by the interfering cells.

42. The apparatus of claim 41, further comprising:
means for measuring quality of a channel indicated in the reference signal, the channel being observed by the apparatus;
means for receiving, from the serving cell, a request to transmit an indication about the measured channel quality; and
means for transmitting the indication to the serving cell in response to the request.

43. A computer-program product for wireless communications, comprising a non-transitory computer readable medium having instructions stored thereon, the instructions being executable by one or more processors and the instructions comprising:
instructions for transmitting, from a user terminal to one or more interfering cells in response to a Request to deliver Spatial Feedback Information (SFI-REQ) to the interfering cells, one or more Spatial Feedback Information (SFI) messages, wherein each SFI message comprises information about a channel between the user terminal and one of the interfering cells, and wherein the SFI-REQ was transmitted from a serving cell of the user terminal; and
instructions for receiving, from the serving cell, a reference signal comprising an indication about an adjusted beam direction of the serving cell, wherein the adjustment is based on one or more SFI messages received at the serving cell from one or more user terminals served by the interfering cells.

44. The computer-program product of claim 43, wherein the instructions further comprise:
instructions for measuring quality of a channel indicated in the reference signal, the channel being observed by the user terminal;
instructions for receiving, from the serving cell, a request to transmit an indication about the measured channel quality; and
instructions for transmitting the indication to the serving cell in response to the request.

45. An apparatus for wireless communications, comprising:
at least one processor configured to
in response to a Request to deliver Spatial Feedback Information (SFI-REQ) to one or more interfering cells, transmit, to the interfering cells, one or more Spatial Feedback Information (SFI) messages, wherein each SFI message comprises information about a channel between the apparatus and one of the interfering cells, and wherein the SFI-REQ was transmitted from a serving cell of the apparatus, and
receive, from the serving cell, a reference signal comprising an indication about an adjusted beam direction of the serving cell, wherein the adjustment is based on one or more SFI messages received at the serving cell from one or more user terminals served by the interfering cells; and
a memory coupled to the at least one processor.

46. The apparatus of claim 45, wherein the processor is further configured to:
measure quality of a channel indicated in the reference signal, the channel being observed by the apparatus;

receive, from the serving cell, a request to transmit an indication about the measured channel quality; and in response to the request, transmit the indication to the serving cell.

\* \* \* \* \*